United States Patent
Kim et al.

(10) Patent No.: US 10,725,572 B2
(45) Date of Patent: Jul. 28, 2020

(54) TOUCH DISPLAY DEVICE, TOUCH SYSTEM, DRIVING CIRCUIT, AND DRIVING METHOD

(71) Applicant: LG Display Co., Ltd., Seoul (KR)

(72) Inventors: HoonBae Kim, Seoul (KR); CheolSe Kim, Daegu (KR); SangHyuck Bae, Seoul (KR)

(73) Assignee: LG Display Co., Ltd., Seoul (KR)

( * ) Notice: Subject to any disclaimer, the term of this patent is extended or adjusted under 35 U.S.C. 154(b) by 67 days.

(21) Appl. No.: 16/197,285

(22) Filed: Nov. 20, 2018

(65) Prior Publication Data

US 2019/0171320 A1    Jun. 6, 2019

(30) Foreign Application Priority Data

Dec. 5, 2017    (KR) .................. 10-2017-0166094

(51) Int. Cl.
  *G06F 3/041*  (2006.01)
  *G06F 3/044*  (2006.01)
  *G06F 3/0354*  (2013.01)

(52) U.S. Cl.
  CPC ........ *G06F 3/0412* (2013.01); *G06F 3/03545* (2013.01); *G06F 3/0416* (2013.01); *G06F 3/0442* (2019.05); *G06F 3/0443* (2019.05); *G06F 3/04162* (2019.05); *G06F 3/04184* (2019.05); *G06F 3/041661* (2019.05); *G06F 3/0441* (2019.05); *G06F 2203/04114* (2019.05)

(58) Field of Classification Search
  None
  See application file for complete search history.

(56) References Cited

U.S. PATENT DOCUMENTS

| | | |
|---|---|---|
| 9,740,367 B2 | 8/2017 | Lin et al. |
| 2016/0266673 A1 | 9/2016 | Dinu et al. |
| 2017/0003854 A1 | 1/2017 | Lin et al. |
| 2017/0249028 A1* | 8/2017 | Marshall ............. G06F 3/03545 |
| 2018/0143703 A1* | 5/2018 | Fleck .................. G06F 3/0346 |

FOREIGN PATENT DOCUMENTS

| | | |
|---|---|---|
| CN | 106325726 A | 1/2017 |
| EP | 3226109 A1 | 10/2017 |
| EP | 3316102 A1 | 5/2018 |
| TW | I367436 B | 7/2012 |
| TW | 201430657 A | 8/2014 |

* cited by examiner

*Primary Examiner* — Duane N Taylor, Jr.
(74) *Attorney, Agent, or Firm* — Fenwick & West LLP

(57) ABSTRACT

The present embodiments relate to a touch display device, a touch system, a driving circuit, and a driving method. The touch display device may include a display panel configured to have a plurality of data lines, a plurality of gate lines, and a plurality of common electrodes, which are arranged thereon, and a driving circuit configured to supply an uplink signal to at least a subset of the plurality of common electrodes disposed in at least a first region of the display panel during the display blank period to enable the pen to detect the uplink signal when the pen is in contact with or is adjacent to the display panel.

20 Claims, 25 Drawing Sheets

TOUCH DISPLAY DEVICE, TOUCH SYSTEM, DRIVING CIRCUIT, AND DRIVING METHOD

CROSS REFERENCE TO RELATED APPLICATION

This application claims priority from Korean Patent Application No. 10-2017-0166094, filed on Dec. 5, 2017, which is hereby incorporated by reference for all purposes as if fully set forth herein.

BACKGROUND OF THE INVENTION

1. Field of the Invention

The present disclosure relates to a touch display device, a touch system, a driving circuit, and a driving method.

2. Description of the Prior Art

The development of an information society has brought about growing demands for various types of touch display devices for displaying images. Recently, various display devices, such as a liquid crystal display device, a plasma display device, and an organic light-emitting display device, have been utilized.

The above display devices provide a touch-based input method that allows a user to easily input information Or commands intuitively and conveniently by replacing conventional input methods such as buttons, a keyboard, or a mouse.

In order to provide such a touch-based input method, it is necessary to recognize a user's touch and to accurately detect touch coordinates.

In addition to fingers, pen touch technology is also being developed in response to growing demands for precise pen touch input.

However, it is not easy for the display device to efficiently provide both a finger-touch function and a pen-touch function while providing a fundamental display function.

For example, touch driving for sensing a pen touch may be influenced by display driving and touch driving for sensing a finger touch, so that the accuracy of the pen-touch sensing deteriorates or the pen-touch sensing is disabled.

SUMMARY OF THE INVENTION

A touch display device comprises a display panel and a driving circuit. The display panel includes a plurality of data lines, a plurality of gate lines, and a plurality of common electrodes. The display panel drives display of an image based on data signals on the data lines and gate signals on the gate lines during a display period and does not drive the display of the image during a display blank period after the display period. The driving circuit is configured to supply an uplink signal to at least a subset of the plurality of common electrodes disposed in at least a first region of the display panel during the display blank period to enable the pen to detect the uplink signal when the pen is in contact with or is adjacent to the display panel.

In an embodiment, a touch controller senses a second region in the display panel that is in contact with or is adjacent to a human body. The driving circuit does not supply the uplink signal to common electrodes disposed in the second region of the display panel that is in contact with or is adjacent to the human body.

In an embodiment, the driving circuit provides a touch driving signal to the plurality of common electrodes during a touch sensing period in the display period. The uplink signal comprises a modulated signal having a higher voltage than the touch driving signal.

In an embodiment, the driving circuit is configured to supply to the plurality of common electrodes during the display period one of: a common voltage comprising a DC voltage to sense a pen signal from the pen, a common signal comprising a modulated signal to sense a finger touch, and both the common voltage and the common signal during different sub-intervals of the display period.

In an embodiment, a data driving circuit driving the data signals on the data lines is configured to boost the data signals based on the modulated signal when the modulated signal is provided to the plurality of common electrodes, and a gate driving circuit driving the gate signals on the gate lines is configured to boost the gate signals based on the modulated signal when the modulated signal is provided to the plurality of common electrodes.

In an embodiment, the display panel is configured to receive a first ground voltage during the display blank period. The display panel is configured to receive during the display period, one of: the first ground voltage, a second ground voltage different from the first ground voltage, and both the first ground voltage and the second ground voltage during different sub-intervals of the display period. In an embodiment, the display panel is configured to display an image and sense a touch by a finger when the second ground voltage is applied to the display panel during the display period. The display panel is furthermore configured to display an image and sense a touch by a pen when the first ground voltage is applied to the display panel during the display period. In an embodiment, the second ground voltage, when compared to the first ground voltage is a modulated signal in which a voltage level varies over time.

In an embodiment, the uplink signal comprises at least one of a beacon signal for transmitting display panel information and a ping signal for signal synchronization.

In an embodiment, the driving circuit is configured to not supply the uplink signal to common electrodes disposed in at least a second region of the display panel during the display blank period. Here, the driving circuit comprises at least one driving IC configured to drive the common electrodes in the first region of the display panel, and at least one driving IC configured to drive the common electrodes in the second region of the display panel.

In another embodiment, a driving circuit drives a display panel. The display pane has a plurality of data lines, a plurality of gate lines, and a plurality of common electrodes. The display panel drives display of an image based on data signals on the data lines and gate signals on the gate lines during a display period and does not drive the display of the image during a display blank period following the display period. The driving circuit comprises a signal supplier configured to supply at least one of a common DC voltage and a common modulated signal to the display panel during the display period, and to supply an uplink signal to at least a subset of the plurality of common electrodes disposed in at least a first region of the display panel during the display blank period. The uplink signal is transmitted to a pen that is in contact with or is adjacent to the display panel.

In an embodiment, the signal supplier is configured to supply the common DC voltage or the common modulated signal to the plurality of electrodes disposed in an entire area of the display panel during the display period.

In an embodiment, the first region of the display panel is detected as being in contact with or is adjacent to the human body, and the driving circuit does not supply the uplink signal to common electrodes disposed in a second region of the display panel that is in contact with or is adjacent to the human body.

In an embodiment, the uplink signal comprises a modulated signal having a higher voltage than the common modulated signal.

In another embodiment, a touch display device comprises a display panel, a touch controller, and a driving circuit. The display panel includes drives display of an image during a display period and includes a plurality of common electrodes. The touch controller senses a first region of the display panel that is not in contact with a human body during a sensing period and a second region of the display panel that is in contact with the human body during the first sensing period. The first region includes a first subset of the plurality of electrodes and the second region includes a second subset of the plurality of electrodes. The driving circuit is configured to supply an uplink signal to the first subset of the plurality of electrodes in the first region of the display panel during an uplink period following the sensing period, and does not supply the uplink signal to the second subset of the plurality of electrodes in the second region of the display panel.

In an embodiment, the sensing period occurs concurrently with the display period, and the uplink period comprises a display blank period following the display period.

In an embodiment, the driving circuit provides a modulated common signal to the plurality of electrodes during the display period for detecting a finger touch, and the uplink signal comprises a modulated signal having a higher voltage than the modulated common signal.

In an embodiment, the driving circuit provides a DC common voltage to the plurality of electrodes during the display period for detecting a pen touch.

In an embodiment, the driving circuit alternately provides a modulated common signal to the plurality of electrodes and a DC common voltage to the plurality of electrodes during different sub-intervals of the display period, the touch controller alternately detects a finger touch and a pen touch during the different sub-intervals, and the uplink signal comprises a modulated signal having a higher voltage than the modulated common signal.

BRIEF DESCRIPTION

The above and other aspects, features, and advantages of the present disclosure will be more apparent from the following detailed description taken in conjunction with the accompanying drawings, in which.

DETAILED DESCRIPTION

Figure 1:
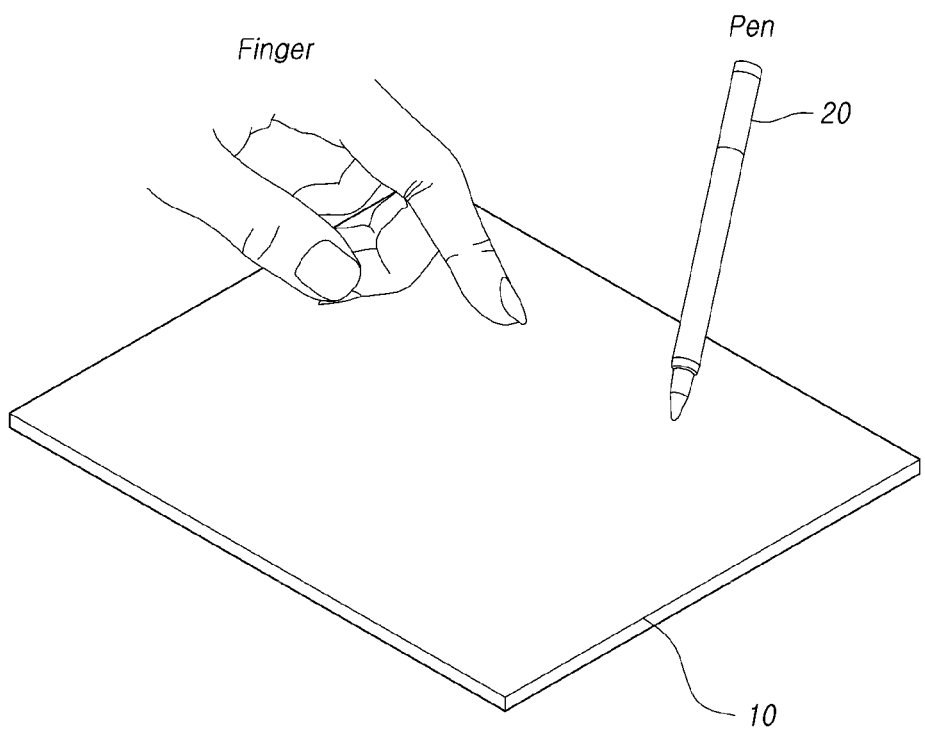
FIG. 1 is a schematic view of a touch system according to embodiments of the present disclosure.

Hereinafter, some embodiments of the present disclosure will be described in detail with reference to the accompanying illustrative drawings. In designating elements of the drawings by reference numerals, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

In addition, terms, such as first, second, A, B, (a), (b) or the like may be used herein when describing components of the present disclosure. Each of these terminologies is not used to define an essence, order or sequence of a corresponding component but used merely to distinguish the corresponding component from other component(s). In the case that it is described that a certain structural element "is connected to", "is coupled to", or "is in contact with" another structural element, it should be interpreted that the certain structural element "is connected to", "is coupled to", or "is in contact with" directly or indirectly the another structural element.

FIG. 1 is a schematic view of a touch system according to embodiments of the present disclosure.

The touch display device 10, according to embodiments of the present disclosure, may provide a function of sensing a touch by a finger or a pen 20, as well as an image display function for displaying an image.

Here, the 'pen 20' may include an active pen, which is a touch tool that has a signal transmission/reception function, which performs interwork operation with the touch display device 10, or which has its own power source, and a passive pen that is a touch tool without its own power source.

The touch tool refers to, as well as a finger, any object capable of touching the screen instead of a finger, and may be referred to as a "touch object" or a "touch pointer".

Hereinafter, the finger may be regarded as representing a passive touch tool, such as a passive pen, and the pen 20 may be regarded as representing an active touch tool such as an active pen.

The touch display device 10, according to embodiments of the present disclosure, may be, for example, a TV set or a monitor, or may be a mobile device such as a tablet or a smartphone.

The touch display device 10, according to embodiments of the present disclosure, may include a display part for providing an image display function and a touch sensing part for touch sensing.

Figure 2:
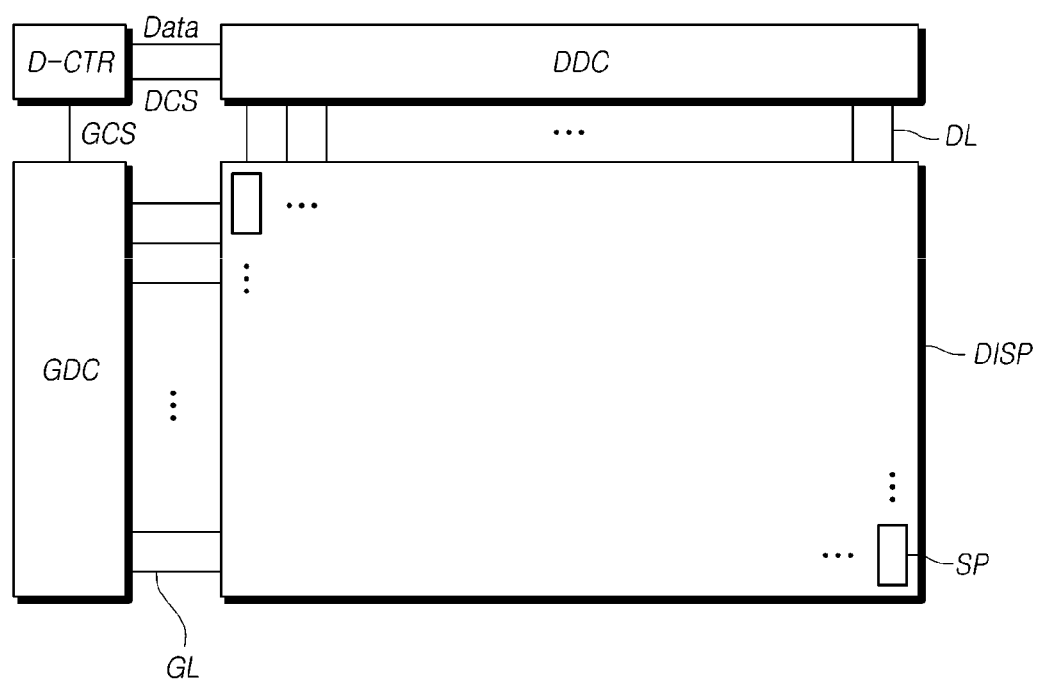
FIG. 2 is a view illustrating a display part in a touch display device according to embodiments of the present disclosure.

FIG. 2 is a view illustrating a display part in a touch display device 10 according to embodiments of the present disclosure.

Referring to FIG. 2, a display part of the touch display device 10, according to embodiments of the present disclosure, includes a display panel (DISP), a data driving circuit (DDC), a gate driving circuit (GDC), and a display controller (D-CTR).

The display panel (DISP) includes a plurality of data lines (DL) and a plurality of gate lines (GL), which are arranged thereon, and a plurality of sub-pixels (SP) defined by the plurality of data lines (DL) and the plurality of gate lines (GL).

The data driving circuit (DDC) supplies a data voltage (data signal) to the plurality of data lines (DL), thereby driving the plurality of data lines (DL).

The gate driving circuit (GDC) sequentially supplies scan signals (gate signals) to the plurality of gate lines (GL), thereby driving the plurality of gate lines (GL).

The display controller (D-CTR) supplies various control signals (DCS or GCS) to the data driving circuit (DDC) and the gate driving circuit (GDC), thereby controlling the operations of the data driving circuit (DDC) and the gate driving circuit (GDC).

The display controller (D-CTR) starts scanning according to a timing implemented in each frame, converts input image data received from the outside to a data signal format used in the data driving circuit (DDC) to thus output the converted image data (Data), and controls data driving at a proper time according to the scan.

The display controller (D-CTR) may be a timing controller (TCON) used in ordinary display technology, or may be a control device including a timing controller and further performing other control functions.

The display controller (D-CTR) may be implemented as a separate component from the data driving circuit (DDC), or may be implemented as an integrated circuit together with the data driving circuit (DDC).

The data driving circuit (DDC) may be configured to include one or more source driver integrated circuits.

The source driver integrated circuit may include a shift register, a latch circuit, a digital-to-analog converter (DAC), an output buffer, and the like.

The source driver integrated circuit may further include an analog-to-digital converter in some cases.

The gate driving circuit (GDC) may be configured to include one or more gate driver integrated circuits.

The gate driver integrated circuit may include a shift register, a level shifter, and the like.

The data driving circuit (DDC) may be positioned only on one side (e.g., the upper side or the lower side) of the display panel (DISP) and, in some cases, may be positioned on both sides (e.g., the upper side and the lower side) of the display panel (DISP) depending on a driving method, a panel designing method, or the like.

The data driving circuit (DDC) may be electrically connected to the display panel (DISP), for example, by a tap carrier package (TCP) type, a chip-on-film (COF) type, or a chip-on-glass (COG) type.

The gate driving circuit (GDC) may be positioned only on one side (e.g., the left side, the right side, the upper side, or the lower side) of the display panel (DISP) and, in some cases, may be positioned on both sides (e.g., the left side and the right side) of the display panel (DISP) depending on a driving method, a panel designing method, or the like.

The gate driving circuit (GDC) may be electrically connected to the display panel (DISP), for example, by a tap carrier package (TCP) type, a chip-on-film (COF) type, or a chip-on-glass (COG) type, and may be directly mounted on the display panel (DISP) by a gate-in-panel (GIP) type.

The display panel (DISP) may adopt various types of display panels such as a liquid crystal display panel, an organic light-emitting display panel, and a plasma display panel.

A sub-pixel structure and a signal line structure of the display panel (DISP) may vary depending on the type of the display panel (DISP).

Figure 3:
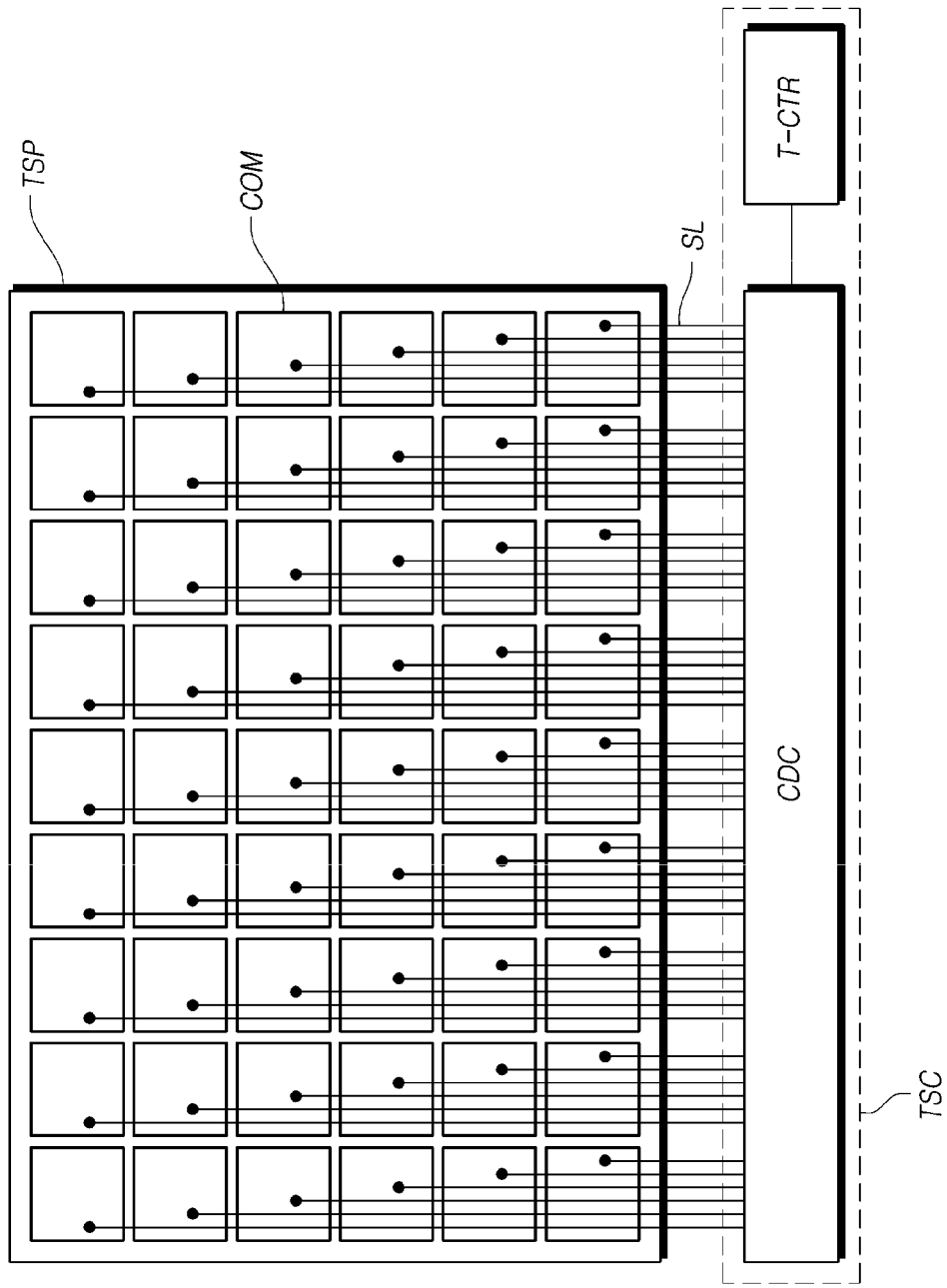
FIG. 3 is a view illustrating a touch sensing part in a touch display device according to embodiments of the present disclosure.
Figure 4:
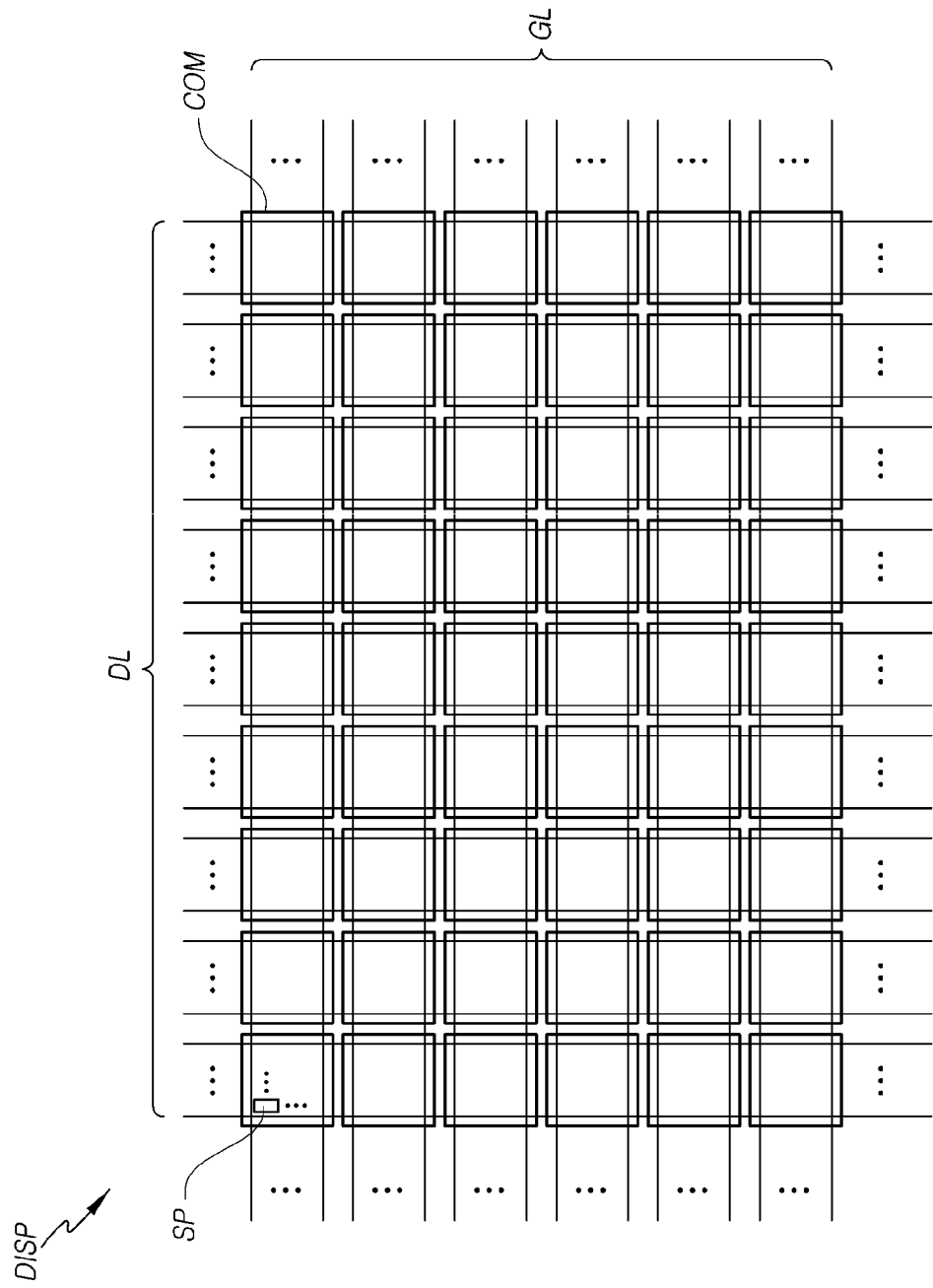
FIG. 4 is a view illustrating a display panel having a touch panel embedded therein in a touch display device according to embodiments of the present disclosure.

FIG. 3 is a view illustrating a touch sensing part in a touch display device 10 according to embodiments of the present disclosure, and FIG. 4 is a view illustrating a display panel (DISP) having a touch panel (TSP) embedded therein in a touch display device 10 according to embodiments of the present disclosure.

As shown in FIG. 3, the touch display device 10, according to embodiments of the present disclosure, may include a touch panel (TSP) and a touch sensing circuit (TSC) for driving the same to sense a touch in order to sense a touch input by a finger and pen 20.

In the touch display device 10 according to embodiments of the present disclosure, the touch panel (TSP) may be provided outside the display panel (DISP), or may be embedded in the display panel (DISP).

In the case where the display panel (DISP) has the touch panel (TSP) embedded therein, for example, it may be an in-cell type or an on-cell type.

As described above, in the touch display device 10 according to embodiments of the present disclosure, the configuration in which the touch panel (TSP) is embedded in the display panel (DISP) represents that touch electrodes are embedded in the display panel (DISP). In this case, when manufacturing the display panel (DISP), the touch electrodes may be formed together with electrodes or signal lines for driving the display.

In the following description, it is assumed that the touch electrodes are embedded in the display panel (DISP). That is, the display panel (DISP) described below is assumed to be a touch panel (TSP)-embedded type, or may be used as the touch panel (TSP).

The touch electrodes embedded in the display panel (DISP), as a dedicated touch sensor, may be disposed inside the display panel (DISP), or may be common electrodes (COM) used in common for display driving for image display, touch driving for finger-touch sensing (also simply referred to as "touch sensing"), and touch driving for pen-touch sensing (also simply referred to as "pen sensing").

In the following description, it is assumed that the touch electrodes embedded as a touch sensor in the display panel (DISP) are common electrodes (COM).

On the display panel (DISP) of the touch display device 10, according to embodiments of the present disclosure, a plurality of common electrodes (COM) may be disposed in a matrix form.

In the touch display device 10 according to embodiments of the present disclosure, a touch sensing circuit (TSC) may include: a common-electrode driving circuit (CDC) configured to supply touch driving signals to a plurality of common electrodes (COM), to detect a signal from at least one of the plurality of common electrodes (COM), and to generate and output sensing data (touch sensing data or pen sensing data) based on the detected signal; and a touch controller (T-CTR) configured to sense a touch by a finger or a pen 20 based on the sensing data (touch sensing data or pen sensing data) output from the common-electrode driving circuit (CDC).

Fundamentally, touch driving for finger-touch sensing (also referred to as "touch sensing" or "finger sensing") and touch driving for pen-touch sensing (also referred to as "pen sensing") may be made in the same manner in which the common-electrode driving circuit (CDC) detects signals through the common electrodes (COM).

The signal detected by the common-electrode driving circuit (CDC) for finger-touch sensing and touch sensing data generated therefrom may vary depending on the presence or absence of a finger touch and the position thereof, and the signal detected by the common-electrode driving circuit (CDC) for pen-touch sensing and pen sensing data generated therefrom may vary depending on the presence or absence of a pen 20 and the position thereof.

The touch display device 10 may provide a self-capacitance-based touch sensing function for sensing a touch by a finger or a pen 20 by measuring the capacitance formed in each common electrode (COM) or a change therein.

In this case, the respective common electrodes (COM) may be applied with touch driving signals so that sensing signals may be sensed.

However, the touch display device 10 may also provide a mutual-capacitance-based touch sensing function for sensing a touch by measuring the capacitance between the common electrodes (COM) or a change therein.

Since a plurality of common electrodes (COM) are used in common for display driving for image display, touch driving for finger-touch sensing, and touch driving for pen-touch sensing, a touch driving signal applied to the plurality of common electrodes (COM) will be referred to as a "common voltage". For the sake of convenience of description, a common voltage and a common signal will be used separately, wherein a common voltage will be used in the case of a DC voltage, in which a voltage level does not vary, and a common signal will be used in the case of a modulated signal in which a voltage level varies.

As will be described later, when a voltage level of the ground voltage of the earthed display panel (DISP) swings, even if a common voltage in the form of a DC voltage is applied to the display panel (DISP), a voltage level of the common voltage of the common electrode (COM) also swings in the display panel (DISP). The common voltage the voltage level of which swings as described above may be referred to as a "common signal".

Referring to FIG. 3, the respective common electrodes (COM) may be electrically connected to the common-electrode driving circuit (CDC) through one or more signal lines (SL).

A first common electrode and a second common electrode positioned in the same column direction will be described in order to figure out the structures of the common electrodes (COM) and the signal lines (SL).

A first signal line connected to the first common electrode may overlap the second common electrode, and may be insulated from the second common electrode in the display panel (DISP).

A second signal line connected to the second common electrode may be insulated from the first signal line in the display panel (DISP).

The shape of the common electrode (COM) shown in FIGS. 3 and 4 is only an example, and may be designed in various forms.

The region where a single common electrode (COM) is formed may correspond to the region where at least one sub-pixel (SP) is formed as to the area thereof.

Alternatively, as shown in FIG. 4, the region where a single common electrode (COM) is formed may be greater than the region where a single sub-pixel (SP) is formed.

In this case, a single common electrode (COM) may overlap two or more data lines (DL) and two or more gate lines (GL).

Referring to the arrangement of the first common electrode and the second common electrode, which are positioned in the same column direction, among the plurality of common electrodes, the first common electrode overlaps two or more data lines and two or more gate lines, and the second common electrode overlaps two or more data lines and two or more gate lines.

Two or more data lines overlapping the first common electrode and two or more data lines overlapping the second common electrode may be the same. Two or more gate lines overlapping the first common electrode and two or more gate lines overlapping the second common electrode may be different from each other.

Referring to the arrangement of a third common electrode and a fourth common electrode, which are positioned in the same row direction, among the plurality of common electrodes, the third common electrode overlaps two or more data lines and two or more gate lines, and the fourth common electrode overlaps two or more data lines and two or more gate lines.

Two or more data lines overlapping the third common electrode and two or more data lines overlapping the fourth common electrode may be different from each other. Two or more gate lines overlapping the third common electrode and two or more gate lines overlapping the fourth common electrode may be the same.

If a region where a single common electrode (COM) is formed is large, it may correspond to several to several tens of sub-pixel regions.

As described above, the touch sensing circuit (TSC), as shown in FIG. 3, may include: one or more common-electrode driving circuits (CDC) configured to supply a touch driving signal {hereinafter, this corresponds to a common signal (SCOM) or common voltage (VCOM)} to a display panel (DISP) and to detect (receive) a sensing signal from the display panel (DISP); and a touch controller (T-CTR) configured to recognize the presence or absence of a touch input and/or the position thereof using the sensing signal detection result of common-electrode driving circuit (CDC).

One or more common-electrode driving circuits (CDC) and the touch controller (T-CTR) may be implemented as separate components or as a single component.

The common-electrode driving circuit (CDC) may be implemented as a read-out integrated circuit (ROIC) corresponding to a touch integrated circuit, and the touch controller (T-CTR) may be implemented as a micro control unit (MCU).

The common-electrode driving circuit (CDC) and the data driving circuit (DDC) may be integrated into an integrated driving circuit, which is an integrated circuit (IC).

That is, the touch display device 10 may include one or more integrated driving circuits, and each integrated driving circuit may include one or more common-electrode driving circuits (CDC) and one or more data driving circuits (DDC).

The integrated implementation of the common-electrode driving circuit (CDC) for touch driving and the data driving circuit (DDC) for data driving may facilitate effective execution of the touch driving and data driving in the case where the touch panel (TSP) is embedded in the display panel (DISP) and the signal lines (SL) connected to the common electrodes (COM) are arranged in parallel with the data lines (DL).

The plurality of common electrodes (COM) disposed as touch electrodes (touch sensor) on the display panel (DISP) may be configured in various forms.

In the case where the touch display device 10 is implemented as a liquid crystal display or the like, the common electrodes (COM) may be intended to form an electric field with pixel electrodes in the respective sub-pixels, which may be utilized for driving the display.

For example, display driving for image display and touch driving for touch sensing (finger-touch sensing or pen-touch sensing) may be performed in a time-division manner. In this case, the common electrodes (COM) may be applied with a common voltage (or common signal) during a display driving period (also referred to as a "display period"). The common electrodes (COM) may be applied with a touch driving signal or a sensing signal may be detected during a touch driving period. Since the common electrodes (COM) are required to be sensed individually, they may be a plurality of blocked electrodes.

When the display driving for image display and the touch driving for touch sensing (finger-touch sensing or pen-touch sensing) are performed in a time-division manner, all of the common electrodes (COM) may be electrically connected inside the common-electrode driving circuit (CDC) so as to be applied, in common, with a common voltage (or common signal) during the display driving period. During the touch driving period, in the common-electrode driving circuit (CDC), all or some of the common electrodes (COM) may be selected so that the one or more selected common electrodes (COM) may be applied with a touch driving signal from the common-electrode driving circuit (CDC), or a sensing signal may be detected by the common-electrode driving circuit (CDC).

As another example, the display driving for image display and the touch driving for touch sensing (finger-touch sensing or pen-touch sensing) may be simultaneously performed. In this case, a common signal or a common voltage applied to the common electrode (COM) acts as a touch driving signal as well.

That is, the common signal or the common voltage applied to the common electrode is the voltage that forms capacitance (that may be formed differently for each sub-pixel) with the data voltage supplied to each of two or more sub-pixels overlapping the common electrode.

In addition, the common electrode (COM) may have a plurality of slits (also referred to as "holes") to form an electric field with pixel electrodes in a plurality of overlapping sub-pixels.

Meanwhile, in the case where the touch display device 10 is implemented as an organic light-emitting display device, a plurality of common electrodes (COM) and a plurality of signal lines (SL) may be positioned in an encapsulation layer of the display panel (DISP). The encapsulation layer may be disposed on the front surface of the display panel (DISP), and may be disposed on a cathode electrode to which a cathode voltage is applied.

In the case where the touch display device 10 is implemented as an organic light-emitting display device, each of the plurality of common electrodes (COM) may be configured in the form of a tubular electrode without openings. In this case, a plurality of common electrodes (COM) of the organic light-emitting display device, for example, may be implemented as a plurality of divided cathode electrodes or the like. The respective common electrodes (COM) may be transparent electrodes for light emission in the sub-pixels (SP).

Alternatively, the respective common electrodes (COM) may be mesh-type electrodes having a plurality of openings. The openings of the respective common electrodes (COM) may correspond to light-emitting regions (e.g., a region where a part of an anode electrode is positioned) of one or more sub-pixels (SP).

Hereinafter, it is assumed that a common electrode (COM) serving as a touch electrode is an electrode that forms an electric field with a pixel electrode in each sub-pixel (SP) and is also used for the display driving.

Therefore, a common voltage and a common signal applied to the common electrode (COM) may be a touch driving signal for finger-touch sensing and pen-touch sensing, and may also be a signal used for the display driving.

Figure 5:
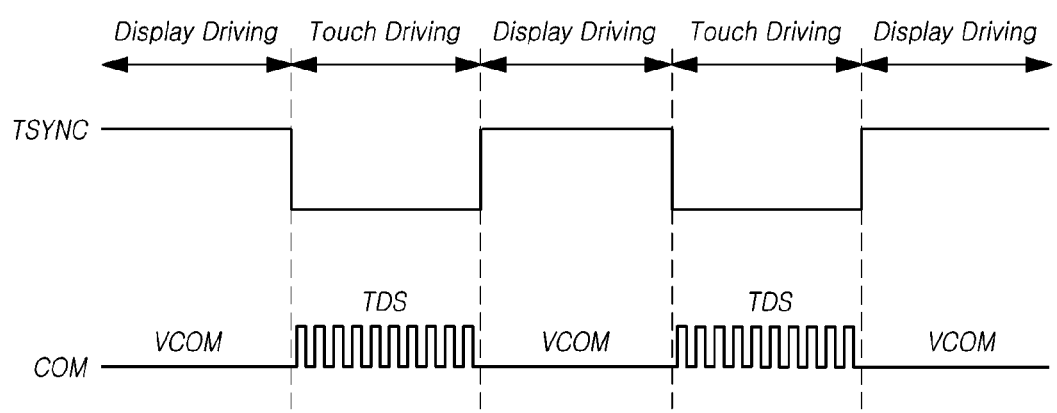
FIG. 5 is a view illustrating a time-division driving method of a touch display device according to embodiments of the present disclosure.

FIG. 5 is a view illustrating a time-division driving method of a touch display device 10 according to embodiments of the present disclosure.

Referring to FIG. 5, the touch display device 10, according to embodiments of the present disclosure, may perform display driving and touch driving in a time-division manner. This driving method is referred to as a "time-division driving method".

The touch display device 10, according to embodiments of the present disclosure, may use a touch synchronization signal (TSYNC) in order to distinguish the display driving period from the touch driving period.

For example, in the touch synchronization signal (TSYNC), a first level (e.g., a high level or a low level) may indicate a display driving period and a second level (e.g., a low level or a high level) may indicate a touch driving period.

One touch driving period existing between the display driving periods may include a touch driving period for finger-touch sensing and a touch driving period for pen-touch sensing.

Alternatively, one touch driving period existing between the display driving periods may be a touch driving period for finger-touch sensing or a touch driving period for pen-touch sensing.

The common electrodes (COM) may be applied with a common voltage (VCOM) corresponding to a specific DC voltage during the display driving period. All or some of the common electrodes (COM) may receive a touch driving signal (TDS) during the touch driving period.

The touch driving signal (TDS) applied to the common electrode (COM) during the touch driving period may be a DC voltage, or may be a signal the voltage level of which varies. In the case where the touch driving signal (TDS) is a signal the voltage level of which varies, the touch driving signal (TDS) may also be a modulated signal, a pulse signal including a plurality of pulses, or an AC signal.

The common electrode (COM) may form parasitic capacitance with other peripheral electrodes while the touch driving signal (TDS) is applied to the common electrode (COM) corresponding to a touch electrode during the touch driving period. This parasitic capacitance may degrade the touch sensitivity.

Accordingly, the touch display device 10 may perform load-free driving (LFD) for reducing the parasitic capacitance. In other words, the touch display device 10 may apply a load-free driving signal to other peripheral electrodes of the common electrode (COM) while applying the touch driving signal (TDS) to the common electrode (COM), which may be a touch electrode, during the touch driving period.

The load-free driving signal, which is a signal for reducing the parasitic capacitance, may be a touch driving signal (TDS) or a signal corresponding to at least one of the frequency, phase, voltage polarity, and amplitude of the touch driving signal (TDS).

Other peripheral electrodes of the common electrode (COM) may be data lines, gate lines, or other common electrodes, and may encompass all of the peripheral electrodes and signal lines, in addition thereto.

During the touch driving period, one or more data lines positioned around the common electrode (COM) or all of the data lines in the display panel (DIPS) may be applied with a load-free driving signal while a touch driving signal (TDS) is applied to the common electrode (COM).

During the touch driving period, one or more gate lines positioned around the common electrode (COM) or all of the gate lines in the display panel (DIPS) may be applied with a load-free driving signal while a touch driving signal (TDS) is applied to the common electrode (COM).

During the touch driving period, one or more common electrodes (COM) positioned around the common electrode (COM) or all of the remaining common electrodes (COM) in the display panel (DIPS) may be applied with a load-free driving signal while a touch driving signal (TDS) is applied to the common electrode (COM).

When the touch display device 10, according to embodiments of the present disclosure, is driven by a time-division driving method, since the frame time must be divided into a display driving period and a touch driving period, the display driving time may be insufficient.

Such a shortage of the display driving time may cause a capacitor for image display (e.g., a capacitor between a pixel electrode and a common electrode) not to be charged as needed.

When the touch display device 10, according to embodiments of the present disclosure, is driven by a time-division driving method, the touch driving time, as well as the display driving time, is insufficient, thereby degrading a touch sensing speed and accuracy.

Accordingly, the touch display device 10, according to embodiments of the present disclosure, may simultaneously perform the display driving and the touch driving by a driving method different from the time-division driving method. This will be described with reference to FIG. 6.

Figure 6:
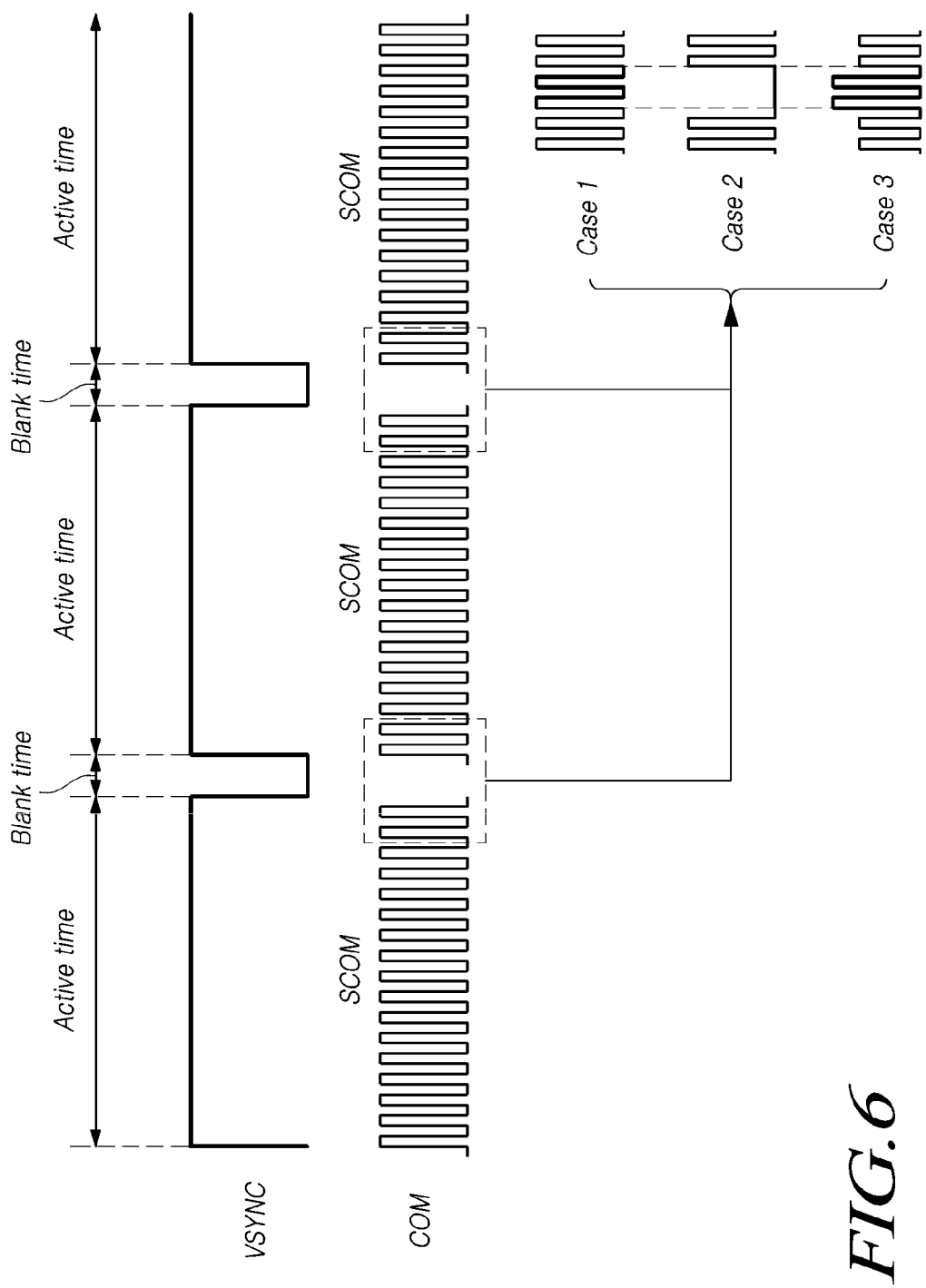
FIG. 6 is a view illustrating a time-free driving method of a touch display device according to embodiments of the present disclosure.

FIG. 6 is a view illustrating a time-free driving method of a touch display device 10 according to embodiments of the present disclosure.

Referring to FIG. 6, the touch display device 10, according to embodiments of the present disclosure, may simultaneously perform display driving and touch driving. This driving method is referred to as "time-free driving (TFD) method".

When the touch display device 10, according to embodiments of the present disclosure, operates in a time-free driving method, a touch synchronization signal (TSYNC) may be required to distinguish between the display driving period and the touch driving period.

In addition, when the touch display device 10, according to the embodiment of the present disclosure, operates in a time-free driving method, a vertical synchronization signal (VSYNC) and/or a horizontal synchronization signal (HSYNC) necessary for display driving may play the role of the touch synchronization signal (TSYNC). FIG. 6 shows the case in which the touch synchronization signal (TSYNC) defining a touch driving period is replaced with a vertical synchronization signal (VSYNC).

The vertical synchronization signal (VSYNC) distinguishes between a display period (that may be a period in which the display driving is in progress) and a display blank period (that may be a period in which the display driving is not performed).

The touch display device 10 may perform display driving and touch driving for an active time corresponding to the display period defined by the vertical synchronization signal (VSYNC). Here, one active time may correspond to one display frame time.

The touch display device 10 does not perform display driving and touch driving for a blank time corresponding to the display blank period defined by the vertical synchronization signal (VSYNC).

When performing time-free driving, during the active time defined by the vertical synchronization signal (VSYNC), the touch display device 10, according to embodiments of the present disclosure, may supply a data voltage for image display to the data lines (DL) while sequentially driving a plurality of gate lines (GL) for display driving, and at the same time, the touch display device 10 may supply a common signal (SCOM) or the like to a plurality of common electrodes (COM) for touch driving.

The common signal (SCOM) is a voltage signal for forming an electric field with a pixel voltage of each sub-pixel for display driving, and may serve as a touch driving signal (TDS) required for touch driving.

In the present specification, a common signal (SCOM) is a signal the voltage level of which varies, and will be described separately from a common voltage (VCOM) which is a DC voltage the voltage level of which is constant.

During the active time, the common signal (SCOM) applied to the common electrode (COM) may be a kind of load-free driving signal.

As described above, when performing the driving operating by a time-free driving method, the touch display device 10, according to embodiments of the present disclosure, may sense a touch by a finger and/or a pen while displaying images through the display driving.

Meanwhile, the touch display device 10, according to embodiments of the present disclosure, may simultaneously perform display driving and touch driving at all frame times (i.e., all active times).

Alternatively, the touch display device 10, according to embodiments of the present disclosure, may perform only the display driving at some frame times (active times), and may simultaneously perform the display driving and the touch driving at other frame times (active times). In some cases, the touch display device 10 may perform only the touch driving at some frame times (active times). In this case, a touch synchronization signal (TSYNC) for defining the touch driving period may be separately required.

The touch display device 10, according to embodiments of the present disclosure, may supply a common signal (SCOM) the voltage level of which varies to the common electrode (COM) during a blank time (Case 1).

Alternatively, the touch display device 10, according to embodiments of the present disclosure, may float the common electrode (COM), may supply a DC voltage to the common electrode (COM), or may supply a specific reference voltage {e.g., a ground voltage (GND)} during the blank time (Case 2).

Alternatively, the touch display device 10, according to embodiments of the present disclosure, may supply a signal different from the common signal (SCOM) to the common electrode (COM) during the blank time (Case 3).

One of the three Cases or a combination thereof may be selectively used depending on a method of using the blank time. For example, the blank time may be used as a special time for the touch driving for pen-touch sensing.

Figure 7:
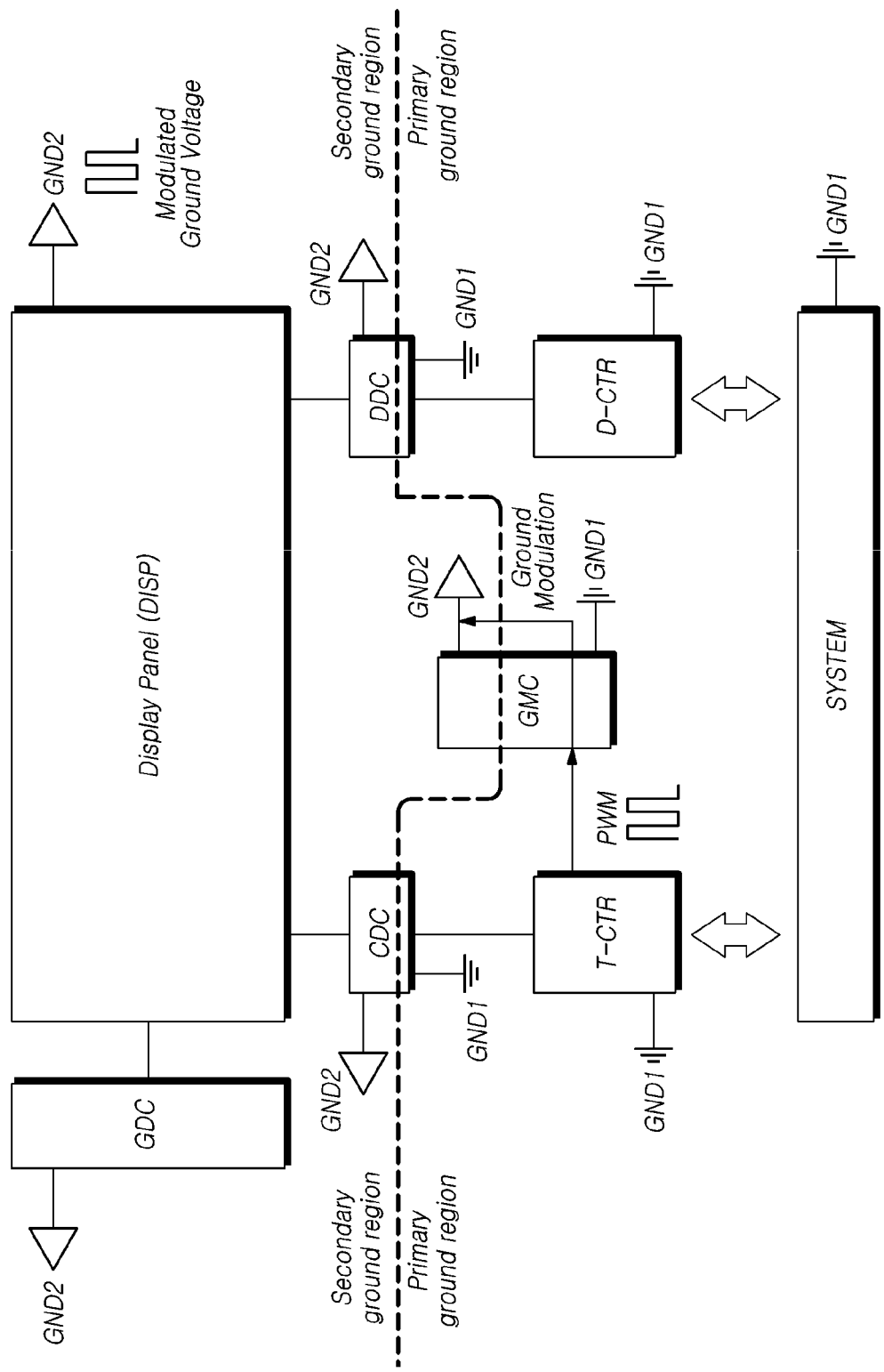
FIG. 7 is a view illustrating grounding states of respective components in a touch display device according to embodiments of the present disclosure.
Figure 8:
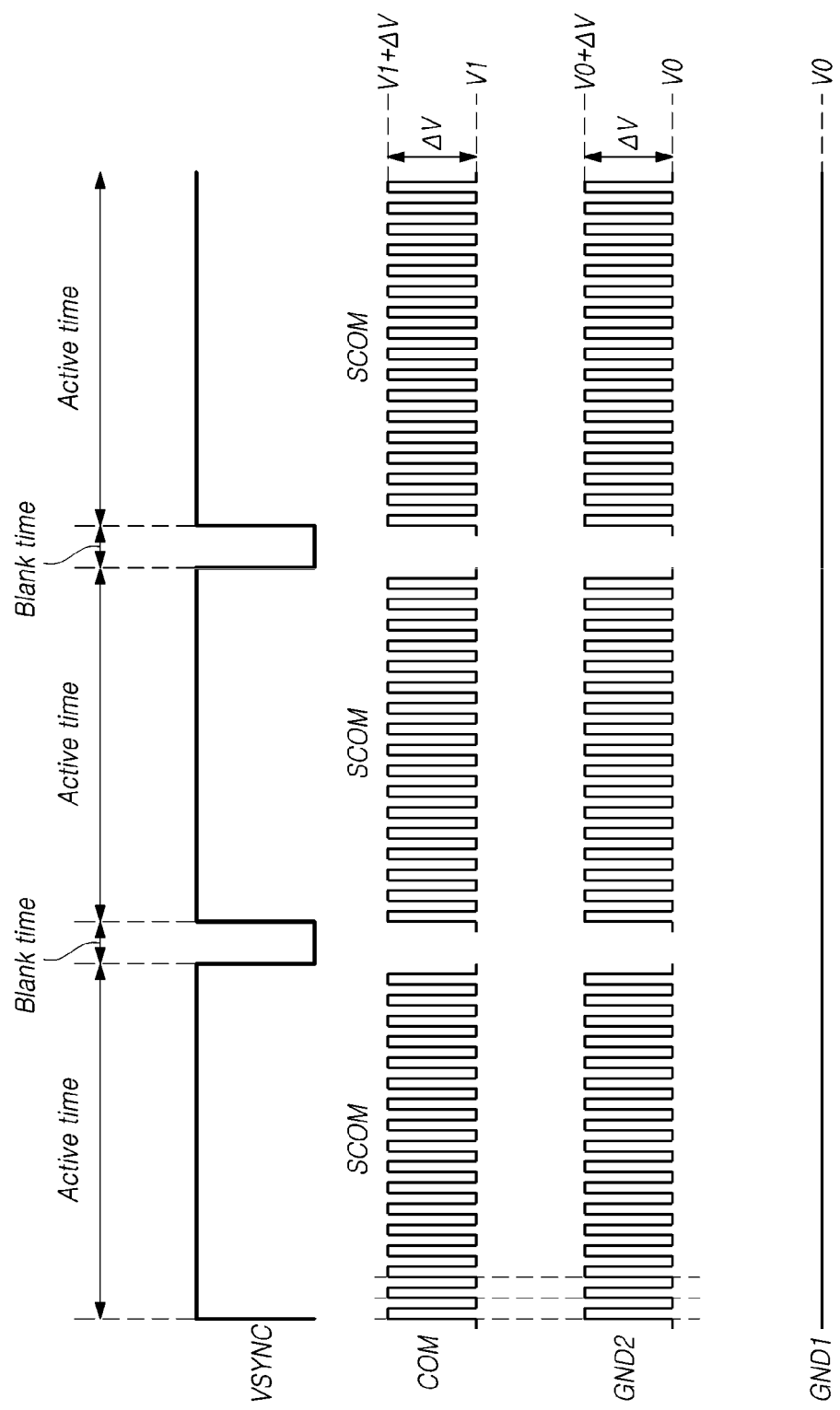
FIG. 8 is a view for explaining a time-free driving method and a ground modulation method of a touch display device according to embodiments of the present disclosure.

FIG. 7 is a view illustrating grounding states of respective components in a touch display device 10 according to embodiments of the present disclosure, and FIG. 8 is a view for explaining a time-free driving method and a ground modulation method of a touch display device 10 according to embodiments of the present disclosure.

Referring to FIG. 7, the touch display device 10, according to embodiments of the present disclosure, may utilize two different ground voltages (GND1 and GND2).

A primary ground corresponding to the first ground voltage (GND1) may be a ground line or a ground electrode disposed inside or outside the display panel (DISP), may be an external structure, such as an outer cover of the display panel (DISP), or may be a line or electrode disposed in such an external structure. A secondary ground corresponding to the second ground voltage (GND2) may be a ground line or a ground electrode disposed inside or outside the display panel (DISP), may be an external structure, such as an outer cover of the display panel (DISP), or may be a line or electrode disposed in such an external structure.

Referring to FIG. 7, a data driving circuit (DDC), a common-electrode driving circuit (CDC), and a gate driving circuit (GDC) may be grounded to the second ground voltage (GND2), and may be grounded to the first ground voltage (GND1) at the same time.

Referring to FIG. 7, a display controller (D-CTR) and a touch controller (T-CTR) may be grounded to the first ground voltage (GND1).

Referring to FIG. 7, the display controller (D-CTR) and the touch controller (T-CTR) may communicate with a system of the touch display device 10. The system may further include a main board, a power device, and various electronic devices. This system may be grounded with a first ground voltage (GND1), which may be a system ground.

In order to utilize two different ground voltages (GND1 and GND2), as shown in FIG. 7, the touch display device 10, according to embodiments of the present disclosure, may include a ground modulation circuit (GMC) having a ground modulating function.

The ground modulation circuit (GMC) may be grounded with both the first ground voltage (GND1) and the second ground voltage (GND2).

Referring to FIG. 8, the two ground voltages (GND1 and GND2) may be relatively different signals. That is, one of the first ground voltage (GND1) and the second ground voltage (GND2) may be a DC voltage and the other may be a modulated signal.

For example, compared to the first ground voltage (GND1), the second ground voltage (GND2) may be a modulated signal (or an AC signal or a pulse signal) the voltage level of which varies. On the contrary, compared to the second ground voltage (GND2), the first ground voltage (GND1) may be a modulated signal (or an AC signal or a pulse signal).

The common signal (SCOM) applied to the common electrode (COM) may be a modulated signal (or an AC signal or a pulse signal) the voltage level of which varies in terms of the first ground voltage (GND1).

Thus, both the common signal (SCOM) and the second ground voltage (GND2), which are applied to the common electrode (COM), may be modulated signals (or AC signals or pulse signals) the voltage level of which varies in terms of the first ground voltage (GND1).

At least one of the characteristics of the common signal (SCOM), such as the frequency, phase, voltage polarity, or amplitude, may be the same as or similar to that of the second ground voltage (GND2).

FIG. 8 shows an example of signal waveforms indicating the second ground voltage (GND2) and the common signal (SCOM) when the first ground voltage (GND1) is regarded as a DC voltage.

For example, the common signal (SCOM) applied to the common electrode (COM) during the active time may be a signal having an amplitude of $\Delta V$, a low-level voltage of V1, and a high-level voltage of V1+$\Delta V$. During the active time, the second ground voltage (GND2) may be a signal having an amplitude of $\Delta V$, a low-level voltage of V0 {V0 may be the first ground voltage (GND1)}, and a high-level voltage of V0+$\Delta V$.

Meanwhile, the data voltage applied to the data line during the active time may be a modulated signal in terms of the first ground voltage (GND1).

At least one of the signal characteristics, such as the frequency, phase, voltage polarity, or amplitude, of the data voltage applied to the data line during the active time may be the same as or similar to that of the second ground voltage (GND2).

In addition, at least one of the signal characteristics, such as the frequency, phase, voltage polarity, or amplitude, of the data voltage applied to the data line during the active time may be the same as or similar to that of the common signal (SCOM).

The first ground voltage (GND1) may look like a signal the voltage level of which varies (modulated signal) from the viewpoint of the second ground voltage (GND2). However, the second ground voltage (GND2) and the common signal (SCOM) may look like DC voltages with respect to each other.

As described above, when the second ground voltage (GND2), which is a modulated signal, is applied to the display panel (DISP), since a data voltage and the common signal (SCOM) applied to the data line (DL) and the common electrode (COM) of the display panel (DISP) have signal waveforms corresponding to the second ground voltage (GND2), there is no change in the voltage environment of the display driving and touch driving performed by a voltage difference.

Therefore, by swinging the second ground voltage (GND2) applied to the display panel (DISP) during the active time, it is possible to provide both the display and the touch sensing during the active time.

Figure 9:
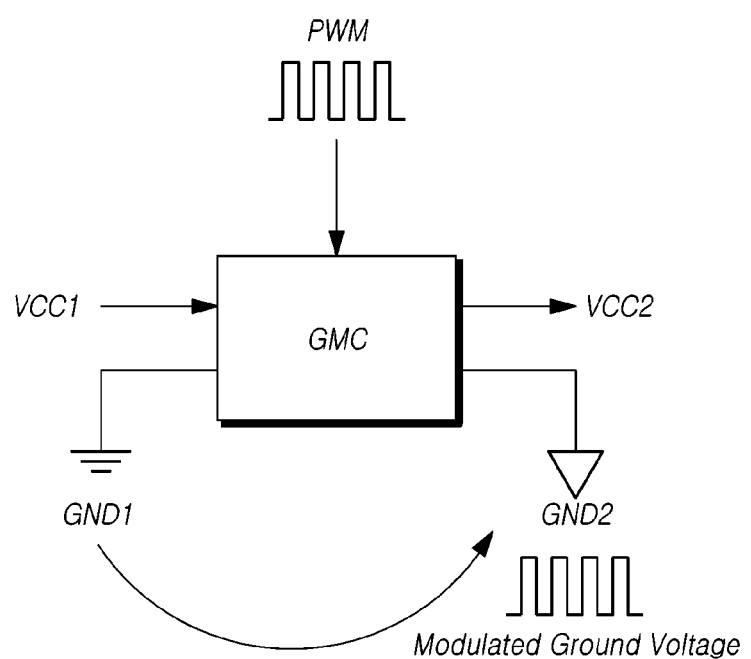
FIGS. 9 and 10 are views illustrating a ground modulation circuit and a ground modulation method of a touch display device according to embodiments of the present disclosure.
Figure 10:
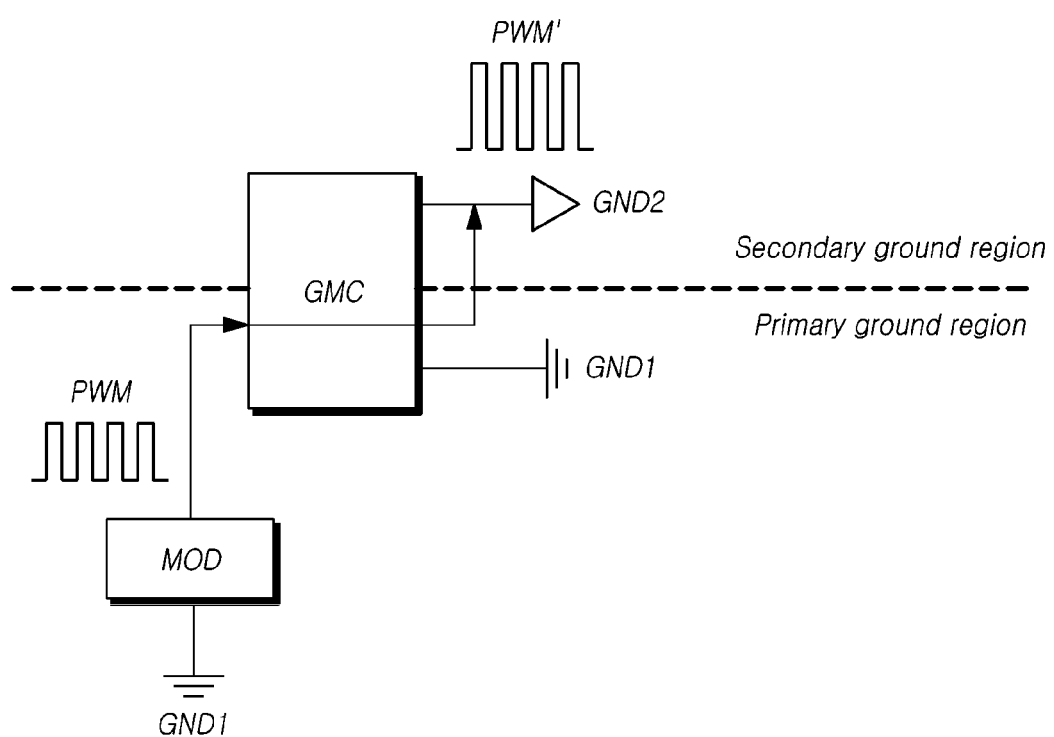

FIGS. 9 and 10 are views illustrating a ground modulation circuit (GMC) and a ground modulation method of a touch display device 10 according to embodiments of the present disclosure.

As described above, when the display panel (DISP) is grounded to the secondary ground having the second ground voltage (GND2) in a modulated signal form, based on the first ground voltage (GND1), voltage levels of all of the electrodes and signal lines, such as the common electrodes (COM), the data lines (DL), the gate lines (GL), and the like, in the display panel (DISP) may swing along with the second ground voltage (GND2).

Referring to FIG. 9, the ground modulation circuit (GMC) may receive a pulse modulated signal {e.g., a pulse-width modulated (PWM) signal}, a power voltage (VCC1), and a first ground voltage (GND1), and may output a modulated power voltage (VCC2) and a second ground voltage (GND2).

Referring to FIGS. 9 and 10, the ground modulation circuit (GMC) may convert one of the first ground voltage (GND1) and the second ground voltage (GND2) to a modulated ground voltage (modulated signal), compared to the other, using a pulse modulated signal {e.g., a pulse-width modulated (PWM) signal}.

To this end, the ground modulation circuit (GMC) may apply a pulse modulated signal {e.g., a pulse-width modulated (PWM) signal} to the first ground voltage or the secondary ground.

As described above, the touch display device 10 may simultaneously and stably perform the display driving and the touch driving by a time-free driving method using the two ground voltages (GND1 and GND2).

The touch display device 10 simultaneously performs the display driving and the touch driving by a time-free driving method, thereby applying a data voltage to a plurality of data lines (DL) while applying the common signal (SCOM) in a modulated signal form to a plurality of common electrodes (COM).

In this case, the common signal (SCOM) applied to the plurality of common electrodes (COM) may correspond, as to at least one of the signal characteristics such as the frequency, phase, voltage polarity, or amplitude thereof, to the second ground voltage (GND2) to which the display panel (DISP) is grounded.

In addition, the data voltage applied to the plurality of data lines (DL) may correspond, as to at least one of the signal characteristics such as the frequency, phase, voltage polarity, or amplitude thereof, to the second ground voltage (GND2) to which the display panel (DISP) is grounded. The data voltage may also be referred to a "data signal".

Referring to FIG. 10, the touch display device 10 may further include a modulator (MOD) for outputting a reference modulated signal (PWM) for ground modulation.

The ground modulation circuit (GMC) may apply a reference modulated signal (e.g., PWM) output from the modulator (MOD) or a modulated signal (e.g., PWM') obtained by amplifying the reference modulated signal (e.g., PWM) to the primary ground having the first ground voltage (GND1) or the secondary ground having the second ground voltage (GND2).

Referring to FIG. 10, if the modulator (MOD) is grounded to the first ground voltage (GND1), the ground modulation circuit (GMC) apply a reference modulated signal (e.g., PWM) output from the modulator (MOD) or a modulated signal (e.g., PWM') obtained by amplifying the reference modulated signal (e.g., PWM) to the secondary ground. Thus, the secondary ground may have the second ground voltage (GND2).

For example, the modulator (MOD) for outputting a pulse modulated signal (e.g., PWM) may be a touch controller (T-CTR) grounded to the first ground voltage (GND1).

The ground modulation circuit (GMC) may include a power separation circuit (not shown) for electrically separating the first ground voltage (GND1) from the second ground voltage (GND2).

Accordingly, even if two ground voltages (GND1 and GND2) are mixed in the touch display device 10, it is possible to perform stable and normal operation without malfunction in the driving operation due to the mixing of the two ground voltages (GND1 and GND2).

For example, the power separation circuit may include at least one of a transformer, a coupled inducer, and a converter. The converter may include, for example, at least one of a fly-back converter, a fly-buck converter, and a buck-boost converter.

The data driving circuit (DDC) and the common-electrode driving circuit (CDC) may be grounded to both the first ground voltage (GND1) and the second ground voltage (GND2) because they must transmit and receive signals to and from the display panel (DISP), which is grounded to the first ground voltage (GND1), and must transmit and receive signals to and from the display controller (D-CTR) and the touch controller (T-CTR), which are grounded to the second ground voltage (GND2).

In this case, the data driving circuit (DDC) and the common-electrode driving circuit (CDC) may include a signal transfer circuit (STC in FIG. 11) for signal transmission between a component grounded to the first ground voltage (GND1) and a component grounded to the second ground voltage (GND2).

The signal transfer circuit (STC), for example, may be implemented as an opto-coupler (O/C) or a digital isolator (D/I).

In an alternative embodiment, a common modulation technique may instead be applied instead of ground modulation. In this technique, a single unmodulated ground voltage may be used as a reference for the data signals and the gate signals. In this embodiment, when the common signal is applied as a modulated signal to the common electrodes, the data signal and the gate signals are combined with a similar modulated signal such that the data signals and the gate signals are boosted by an amplitude of the common signal. For example, if the modulated signal applied to the common electrode alternates between a voltage V0 and a voltage V0+ΔV, the data signals and the gate signals may be boosted by ΔV when the modulated signal is V0+ΔV. This modulation technique thus has a similar effect as the above-described ground modulation technique without necessarily requiring two grounds.

Figure 11:
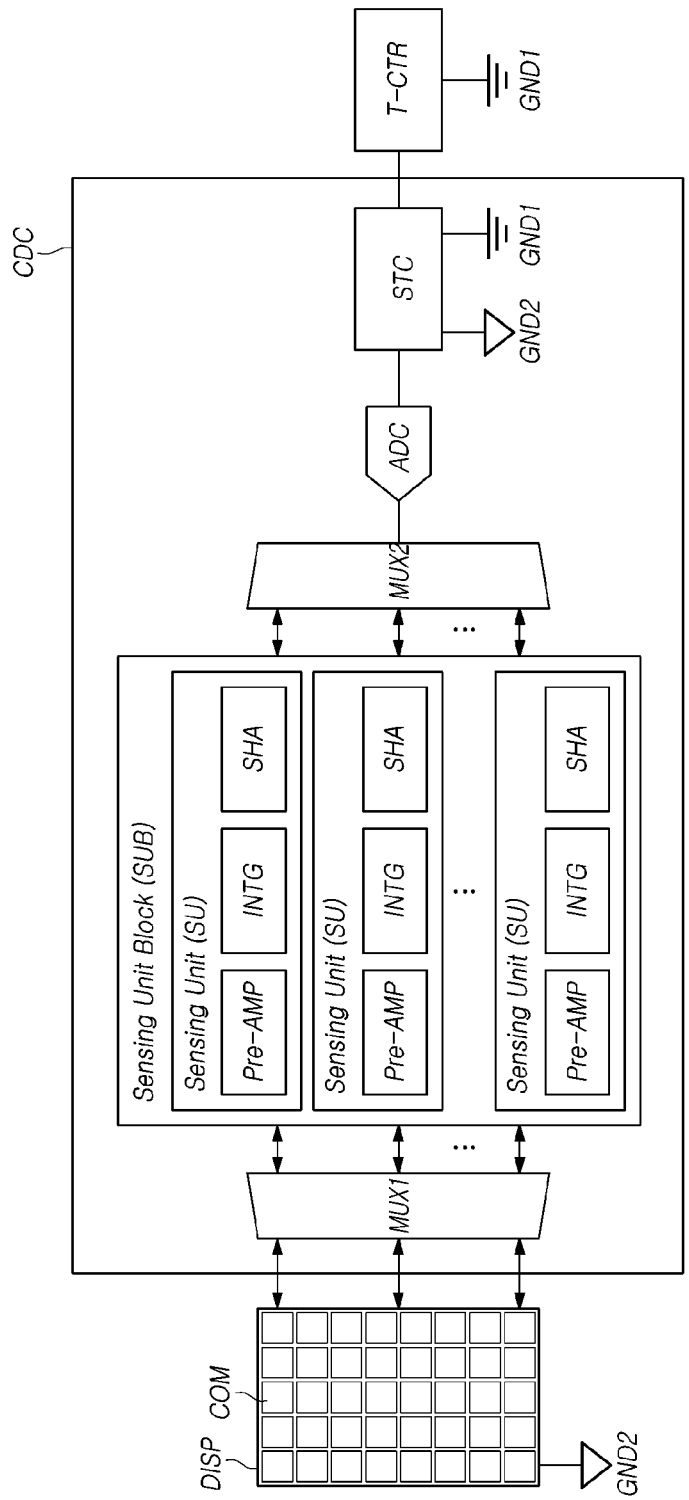
FIG. 11 is a view illustrating a common-electrode driving circuit of a touch display device according to embodiments of the present disclosure.
Figure 12:
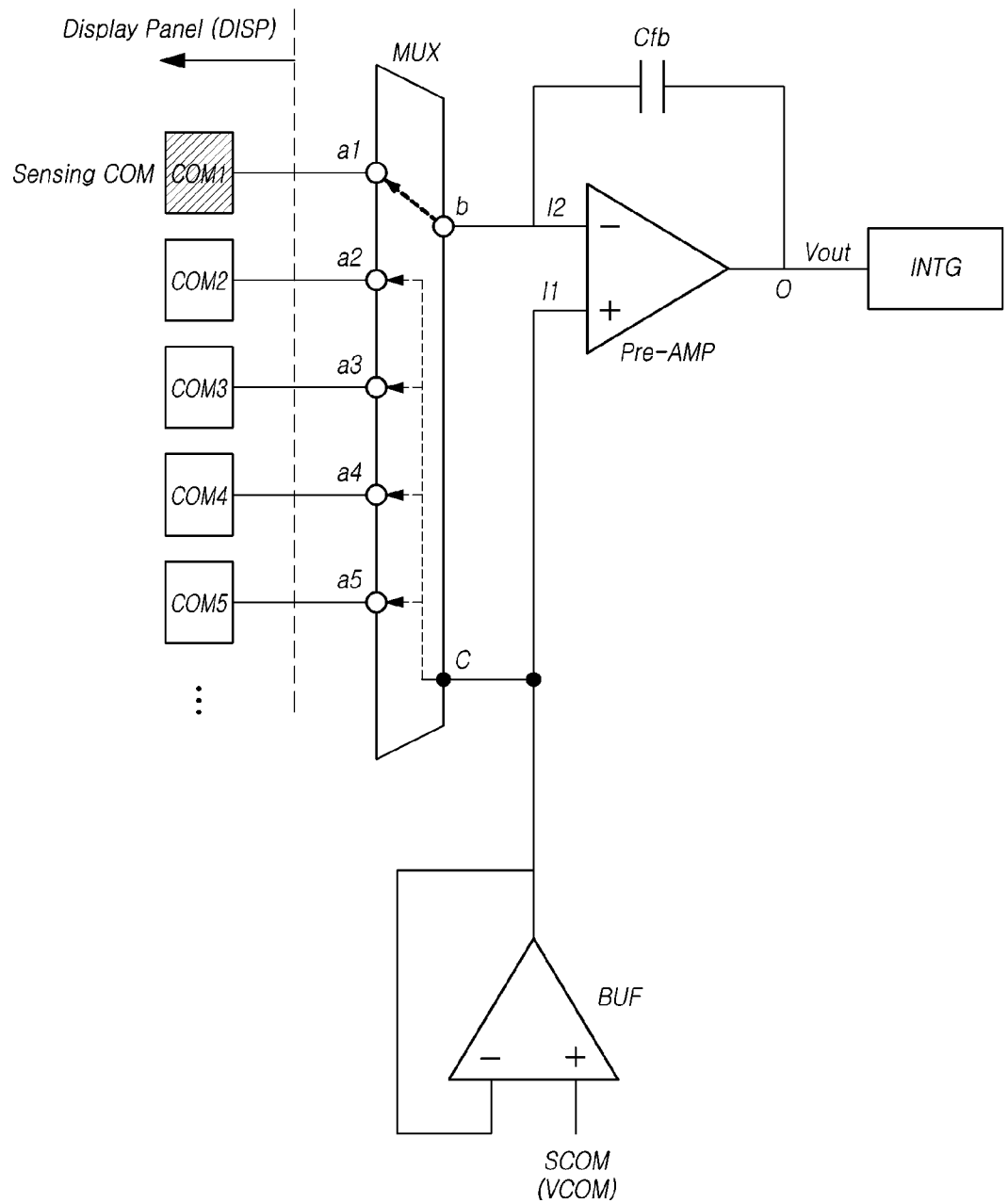
FIG. 12 is a view illustrating a fundamental method in which a common-electrode driving circuit of a touch display device drives respective common-electrode columns according to embodiments of the present disclosure.

FIG. 11 is a view illustrating a common-electrode driving circuit (CDC) of a touch display device 10 according to embodiments of the present disclosure, and FIG. 12 is a view illustrating a fundamental method in which a common-electrode driving circuit (CDC) of a touch display device 10 drives respective common-electrode columns according to embodiments of the present disclosure.

Referring to FIG. 11, a common-electrode driving circuit (CDC), according to embodiments of the present disclosure, may include a first multiplexer circuit (MUX1), a sensing unit block (SUB) including a plurality of sensing units (SU), a second multiplexer circuit (MUX2), and an analog-to-digital converter (ADC).

The first multiplexer circuit (MUX1) may include one or more multiplexers. The second multiplexer circuit (MUX2) may include one or more multiplexers.

Each sensing unit (SU) may include a pre-amplifier (Pre-AMP), an integrator (INTG), and a sample-and-hold circuit (SHA).

The pre-amplifier (Pre-AMP) may be electrically connected to one or more common electrodes (COM).

The pre-amplifier (Pre-AMP) may receive a sensing signal from one common electrode, which is a target to be sensed, among the one or more connectable common electrodes (COM).

A more detailed description will be made with reference to FIG. 12. A multiplexer (MUX) included in the first multiplexer circuit (MUX1) selectively connects one common electrode (COM1), which is a target to be sensed among a plurality of common electrodes (COM1, COM2, COM3, COM4, COM5, . . . ), to a pre-amplifier (Pre-AMP).

That is, the multiplexer (MUX) connects a node "a1" connected to the common electrode (COM1), which is a target to be sensed, with a node "b" connected to the pre-amplifier (Pre-AMP).

Thus, the pre-amplifier (Pre-AMP) receives a common voltage (VCOM) or a common signal (SCOM) output from a power supply circuit through a buffer (BUF) and a first input terminal (I1), and outputs the same to a second input terminal (I2).

The common voltage (VCOM) or the common signal (SCOM) output from the second input terminal (I2) of the pre-amplifier (Pre-AMP) is supplied to the common electrode (COM1) selected by the multiplexer (MUX).

When the common-electrode driving circuit (CDC) including the pre-amplifier (Pre-AMP) is grounded to the second ground voltage (GND2), even if a signal input into the first input terminal (I1) of the pre-amplifier (Pre-AMP) is a common voltage (VCOM) in the form of a DC voltage, a signal output from the second input terminal (I2) of the pre-amplifier (Pre-AMP) may be a common signal (SCOM) in the form of a modulated signal.

In a different way, when the display panel (DISP), in which the common electrodes (COM) are disposed, is grounded to the second ground voltage (GND2), even if a signal output from the second input terminal (I2) of the pre-amplifier (Pre-AMP) is a common voltage (VCOM) in the form of a DC voltage, a signal actually applied to the common electrodes (COM) in the display panel (DISP) may be a common signal (SCOM) in the form of a modulated signal.

The multiplexer (MUX) connects nodes (a2, a3, a4, a5, . . . ) connected to the remaining common electrodes (COM2, COM3, COM4, COM5, . . . ), except for the sensing-target common electrode (COM1), among the plurality of connectable common electrodes (COM1, COM2, COM3, COM4, COM5, . . . ), to a node "c" connected to the power supply circuit through the buffer (BUF).

The remaining common electrodes (COM2, COM3, COM4, COM5, . . . ), except for the sensing-target common electrode (COM1), among the plurality of connectable common electrodes (COM1, COM2, COM3, COM4, COM5, . . . ), may receive the common voltage (VCOM) or the common signal (SCOM) directly from the power supply circuit without passing through the pre-amplifier (Pre-AMP).

Then, the pre-amplifier (Pre-AMP) in the common-electrode driving circuit (CDC) may receive a sensing signal from the sensing-target common electrode (COM1), among the common electrodes (COM) disposed in the display panel (DISP) grounded to the first ground voltage (GND1) and the second ground voltage (GND2).

A feedback capacitor (Cfb) may be charged by means of the sensing signal received as described above, so that a signal output from the output terminal "O" of the pre-amplifier (Pre-AMP) may be input into the integrator (INTG).

The pre-amplifier (Pre-AMP) and the integrator (INTG) may be integrated.

The integrator (INTG) integrates signals (Vout) output from the pre-amplifier (Pre-AMP).

The analog-to-digital converter (ADC) may output, to the touch controller (T-CTR), sensing data obtained by converting the integral value output from the integrator (INTG) to a digital value.

The analog-to-digital converter (ADC) may output the sensing data to the touch controller (T-CTR) grounded to the first ground voltage (GND1).

The sensing data may be touch sensing data for finger-touch sensing or pen sensing data for pen-touch sensing.

The common-electrode driving circuit (CDC), according to embodiments of the present disclosure, may further include a signal transfer circuit (STC) for transferring signals to the touch controller (D-CTR). In this case, the signal transfer circuit (STC) may be grounded to both the first ground voltage (GND1) and the second ground voltage (GND2).

Figure 13:
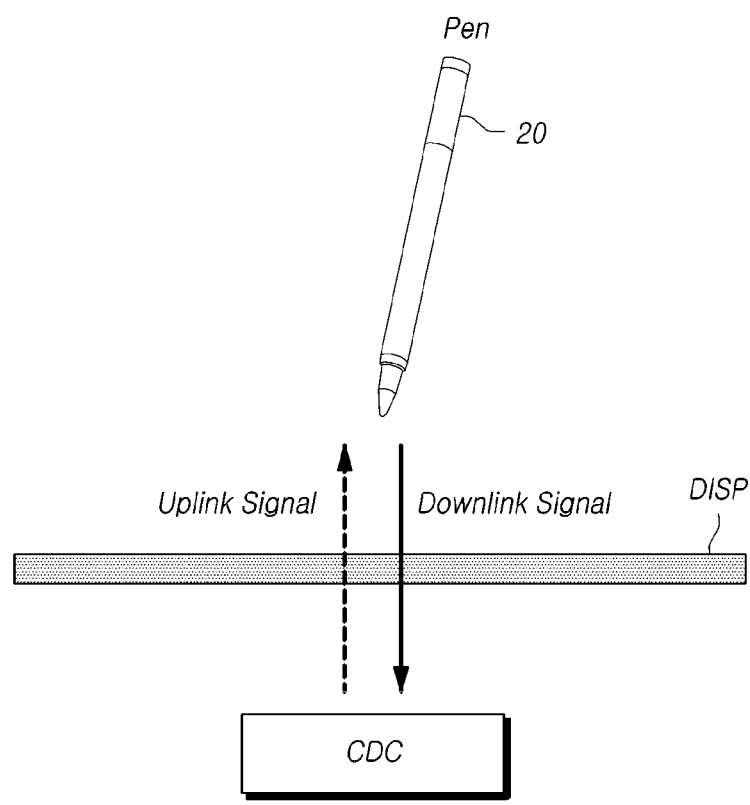
FIG. 13 is a view illustrating a driving operation between a touch display device and a pen according to embodiments of the present disclosure.

FIG. 13 is a view illustrating a driving operation between a touch display device 10 and a pen 20 according to embodiments of the present disclosure.

In the case of touch driving for pen-touch sensing, the touch display device 10 transmits, to the pen 20, an uplink signal including a variety of information for controlling the driving of the pen 20 or a variety of information necessary for driving the pen 20. The pen 20 outputs a downlink signal indicating the position of the pen 20, the tilt thereof (slope of a pen), or other additional information in response to the uplink signal transmitted from the touch display device 10. The touch display device 10 may sense the downlink signal output from the pen 20 through a common electrode (COM), thereby sensing a pen touch.

The uplink signal may include, for example, a beacon signal or a ping signal.

The beacon signal is a control signal for the touch display device 10 to control the driving of the pen 20 or for informing the pen 20 of necessary information, and may include a variety of information necessary for the driving of the pen.

For example, the beacon signal may include at least one piece of panel information (e.g., panel status information, panel identification information, panel type information such as an in-cell type), panel driving mode information (e.g., mode identification information such as a pen search mode, a pen mode, or the like), characteristic information on the downlink signal (e.g., frequency, the number of pulses, or the like), driving timing-related information, multiplexer driving information, and power mode information (e.g., information on LHB in which a panel and a pen are not driven for reducing power consumption), and may further include information for driving synchronization between the display panel (DISP) and the pen 20.

The ping signal may be a control signal for synchronization of the downlink signal.

The additional information that may be contained in the downlink signal may include, for example, at least one of a pen ID, button information, battery information, information for checking and correcting information errors, and the like.

Figure 14:
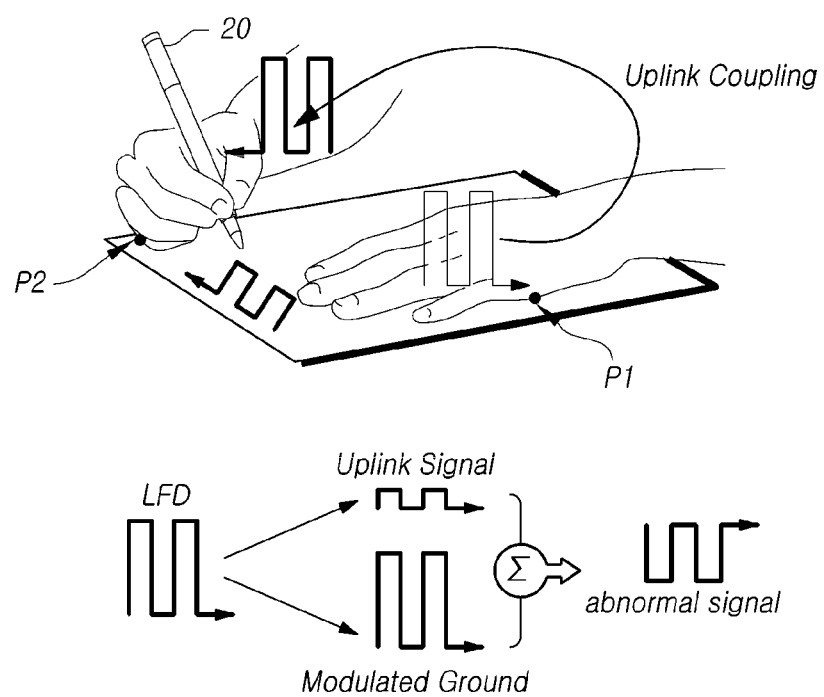
FIG. 14 is a view showing a distortion phenomenon of an uplink signal caused by a palm in a touch system according to embodiments of the present disclosure.

FIG. 14 is a view showing a distortion phenomenon of an uplink signal caused by a palm in a touch system according to embodiments of the present disclosure.

In the case of touch driving for pen-touch sensing, when a user performs a touch input using a pen 20 while the display panel (DISP) is grounded to the second ground voltage (GND2) and while a beacon signal is applied to the common electrodes (COM), the pen 20 receives the beacon signal through a pen tip.

At this time, when a human body, such as a palm of a user, touches the display panel (DISP), various signals, such as the second ground voltage (GND2), which is a modulated ground voltage in the display panel (DISP), the beacon signal applied to the display panel (DISP), or the like, may flow into the pen 20 through the human body.

The palm of a user's hand opposite the hand holding the pen 20 may touch the point P1 in the display panel (DISP). Alternatively, the palm of the user's hand holding the pen 20 may touch the point P2 in the display panel (DISP).

As described above, the signal flowing into the pen 20 through the human body may act as noise during touch driving for pen-touch sensing. Accordingly, the beacon signal received through the tip of the pen 20 may make coupling with noise introduced through the human body. The uplink signal, such as a beacon signal, may be distorted due to this uplink coupling phenomenon.

Accordingly, the pen 20 cannot normally recognize desired information from the beacon signal, which is an uplink signal, and cannot perform the driving operation for pen-touch sensing, or cannot normally perform the same.

In this case, since the pen 20 cannot output a downlink signal or cannot normally output the same, the touch display device 10 cannot normally recognize the position of the pen, the tilt thereof, a variety of additional information, or the like, and cannot perform normal pen-touch sensing.

Therefore, embodiments of the present disclosure may provide a driving method for preventing distortion of an uplink signal, such as a beacon signal caused by a palm, in order to improve the accuracy of pen-touch sensing. Hereinafter, this will be described in detail.

Figure 15:
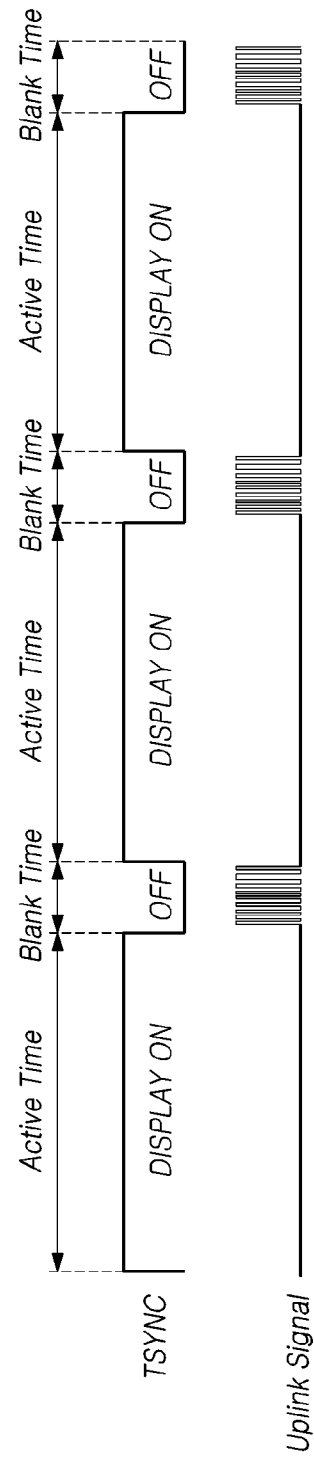
FIG. 15 is a view illustrating a transmission timing of an uplink signal in order to prevent distortion of the uplink signal caused by a palm in a touch system according to embodiments of the present disclosure.

FIG. 15 is a view illustrating a transmission timing of a beacon signal, which is a kind of uplink signal, in order to prevent distortion of an uplink signal caused by a palm in a touch system according to embodiments of the present disclosure.

Referring to FIG. 15, when performing the driving operation by a time-free driving method, the touch display device 10, according to embodiments of the present disclosure, may control a display driving timing using a touch synchronization signal (TSYNC) defining a display driving period (display-ON period) and a display blank period (display-OFF period).

The touch synchronization signal (TSYNC) may be a control signal that alternates between a first level (e.g., a high level or a low level) and a second level (e.g., a low level or a high level).

A vertical synchronization signal (VSYNC) used as a display driving timing control signal may be used as the touch synchronization signal (TSYNC).

In the touch synchronization signal (TSYNC), the active time period corresponds to the display driving period (display-ON period), and the blank time period corresponds to the display blank period (display-OFF period).

A touch system, according to embodiments of the present disclosure, may include: a touch display device 10 including a display panel (DISP) and a common-electrode driving circuit (CDC) for supplying an uplink signal to the display panel (DISP); and a pen 20 for receiving the uplink signal from the display panel (DISP).

Referring to FIG. 15, the uplink signal may not be supplied to the display panel (DISP) during a display period (active time), and may be supplied to the display panel (DISP) during a display blank period (blank time).

Accordingly, the uplink signal may be transmitted from the display panel (DISP) to the pen 20 without being affected by the display driving.

The uplink signal may be supplied to common electrodes (COM) in the entire area of the display panel (DISP). Alternatively, the uplink signal may be supplied to common electrodes (COM) in at least a portion of the display panel (DISP).

Figure 16:
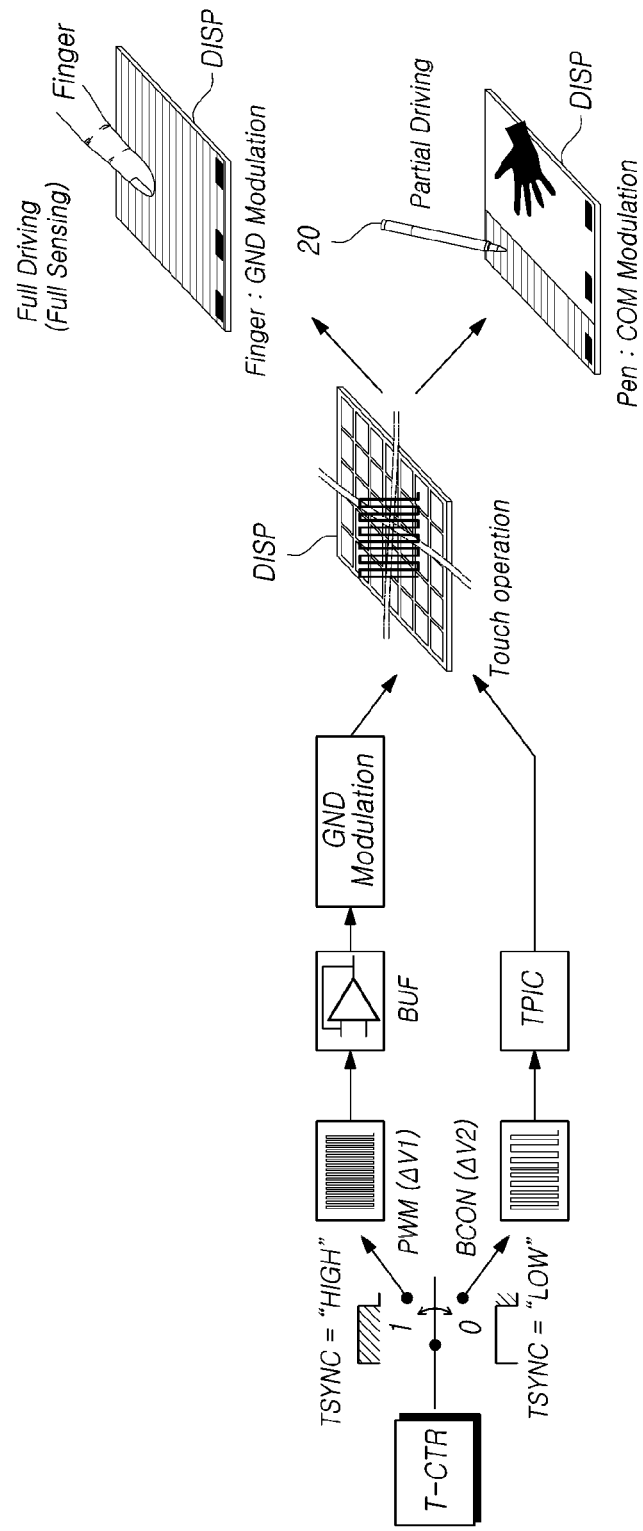
FIG. 16 is a view for explaining a driving method for preventing distortion of an uplink signal caused by a palm in a touch system according to embodiments of the present disclosure.
Figure 17:
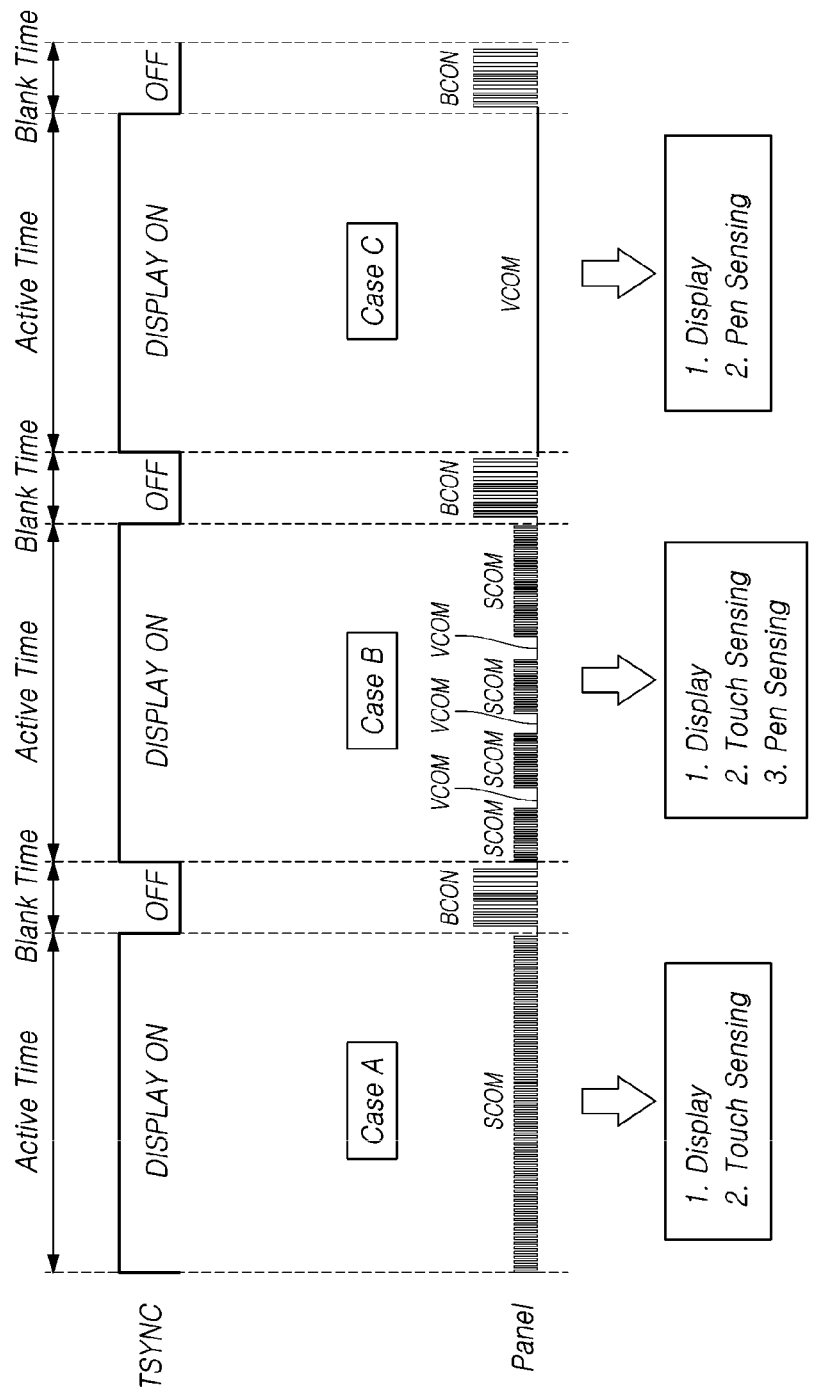
FIG. 17 is a driving timing diagram for display, touch sensing, and pen sensing in order to prevent distortion of an uplink signal caused by a palm in a touch system according to embodiments of the present disclosure.

FIG. 16 is view for explaining a driving method for preventing distortion of an uplink signal caused by a palm in a touch system according to embodiments of the present disclosure. FIG. 17 is a driving timing diagram for display, touch sensing, and pen sensing in order to prevent distortion of an uplink signal caused by a palm in a touch system according to embodiments of the present disclosure.

Referring to FIG. 16, a touch controller (T-CTR) performs control such that a display period proceeds when the touch synchronization signal (TSYNC) has a high level (or low level).

When the touch synchronization signal (TSYNC) has a high level (or low level), the touch controller (T-CTR) may output a pulse modulated signal (e.g., PWM) having an amplitude of $\Delta V1$ to the ground modulation circuit (GMC).

Thus, the ground modulation circuit (GMC) performs a ground modulating function.

Therefore, the second ground voltage (GND2) may be applied to the display panel (DISP) during the display period. The second ground voltage (GND2) may be a modulated ground voltage, compared to the first ground voltage (GND1).

According to the above ground modulation, a common signal (SCOM) in the form of a modulated signal is applied to the common electrodes (COM) disposed in the entire area of the display panel (DISP) by the common-electrode driving circuit (CDC). The frequency and amplitude of the common signal (SCOM) may correspond to those of the second ground voltage (GND2). Driving in the entire area of the display panel (DISP) is referred to as "full driving".

Accordingly, during the display period, a touch by a finger may be sensed in the entire area of the display panel (DISP) while an image is displayed on the display panel (DISP). Touch sensing in the entire area of the display panel (DISP) is referred to as "full sensing".

Referring to FIG. 16, the touch controller (T-CTR) performs control such that the display blank period proceeds when the touch synchronization signal (TSYNC) has a low level (or high level).

When the touch synchronization signal (TSYNC) has a low level (or high level), the touch controller (T-CTR) may output a beacon signal (BCON) having an amplitude of $\Delta V2$ as an example of the uplink signal. The amplitude $\Delta V2$ may be greater than the amplitude $\Delta V1$.

Thus, an uplink signal, such as a beacon signal (BCON), may be applied to the display panel (DISP) by a touch power integrated circuit (TPIC) corresponding to a power supply circuit during the display blank period.

Therefore, an uplink signal, such as a beacon signal (BCON), may be transmitted from the display panel (DISP) to the pen 20 during the display blank period.

During the display blank period (blank time), the uplink signal may be limitedly supplied to only a second region, except for at least one first region, instead of being supplied to the entire area of the display panel (DISP). Driving in a portion of the display panel (DISP) is referred to as "partial driving".

At least one first region corresponds to a region in the display panel (DISP), in which the uplink signal may be distorted.

For example, at least one first region may be a region that is in contact with or is adjacent to a human body. At least one first region may be a region in which a touch or proximity of a human body has been confirmed by means of touch coordinates, which are sensed through finger-touch sensing.

At least one of the number, size, or position of the first region(s) may vary depending on the environment in which the user uses the pen 20.

In the display panel (DISP), the second region may be the remaining region excluding at least one first region in the entire area of the display panel (DISP), and may be a region in which the uplink signal is not distorted.

According to the above description, the uplink signal may not be supplied to at least one first region that is in contact with or is adjacent to a human body, thereby reducing or preventing the phenomenon in which the uplink signal through the human body, as noise, is introduced into the pen 20. Thereby, the touch driving for pen-touch sensing can be normally performed, so that the accuracy of the pen-touch sensing can be improved.

In terms of the common electrode driving, all of the common electrodes (COM) disposed in the entire area of the display panel (DISP) may be applied with a common voltage (VCOM) in the form of a DC voltage or a common signal (SCOM) in the form of a modulated signal during the display period before or after the display blank period (full driving).

Thus, during the display period before or after the display blank period, a touch by a finger or a touch by a pen 20 may be sensed while displaying an image on the display panel (DISP).

Meanwhile, during the display blank period, an uplink signal in the form of a modulated signal may be supplied only to the common electrode (COM) disposed in the second region, among the common electrodes (COM) disposed on the display panel (DISP) (partial driving).

In this case, during the display blank period, the common electrode (COM) disposed in at least one first region, among the common electrodes (COM) disposed on the display panel (DISP), may be floated, or may be applied with a signal in the form of a DC voltage or a signal different from the uplink signal.

Therefore, during the display blank period, since a modulated signal is not applied to the common electrode (COM) disposed in the first region of the display panel (DISP), it is possible to prevent the modulated ground voltage from flowing, as noise, into the pen 20 through the human body. Accordingly, the touch driving for pen-touch sensing can be normally performed, so that the accuracy of the pen-touch sensing can be improved.

Meanwhile, the first ground voltage (GND1) may be applied to the display panel (DISP) during the display blank period. Therefore, the modulated signal is applied only to the second region of the display panel (DISP), and is not applied to the first region (COM Modulation).

On the other hand, the second ground voltage (GND2), which is a modulated ground voltage, may be applied to the display panel (DISP) during all or some of the display period before or after the display blank period (GND Modulation).

In other words, the first ground voltage (GND1) or the second ground voltage (GND2) may be applied to the display panel (DISP) during the display period, and the first ground voltage (GND1) and the second ground voltage (GND2) may be applied to the display panel (DISP) at different timings during the display period.

Accordingly, during the display period, the common voltage (VCOM) in the form of a DC voltage may be supplied to the common electrodes (COM) disposed in the entire area of the display panel (DISP), a common signal (SCOM) in the form of a modulated signal may be supplied to the common electrodes (COM) disposed in the entire area of the display panel (DISP), or the common voltage (VCOM) and the common signal (SCOM) may be supplied, at different timings, to the common electrodes (COM) disposed in the entire area of the display panel (DISP).

In terms of application of a ground modulation method, the ground modulation method may or may not be applied during the display period. However, the ground modulation method is not applied during the display blank period.

Therefore, since the second ground voltage (GND2) in the form of a modulated ground voltage is not applied to the display panel (DIPS) during the display blank period in which the uplink signal is transmitted from the display panel (DIPS) to the pen 20, it is possible to technically prevent the second ground voltage (GND2) in the form of a modulated ground voltage from flowing into the pen 20 through a human body.

As shown in FIG. 17, each of a plurality of display periods may be a period in which an image is displayed and a touch by a finger may be sensed (Case A), a period in which an image is displayed and touches by a finger and a pen may be sensed (Case B), or a period in which an image is displayed and a touch by a pen may be sensed (Case C).

Referring to FIG. 17, in Case A, the second ground voltage (GND2) corresponding to a modulated ground voltage is applied to the display panel (DISP) during the display period.

Accordingly, a common signal (SCOM) whose frequency and amplitude correspond to those of the second ground voltage (GND2) may be applied to the common electrodes (COM) disposed in the entire area of the display panel (DISP).

The touch display device 10 may display an image on the display panel (DISP), and may sense a touch by a finger on the display panel (DISP) using the common signals (SCOM) applied to the common electrodes (COM).

That is, during the display period, since the second ground voltage (GND2) corresponding to a modulated ground voltage is applied to the display panel (DISP), the common signal (SCOM) applied to the common electrodes (COM) disposed in the display panel (DISP) may be a modulated signal the voltage level of which varies. Accordingly, the common electrodes (COM) may serve as touch sensors, as well as display driving electrodes, capable of sensing a touch by a finger during the display period.

Referring to FIG. 17, in Case C, the first ground voltage (GND1) in the form of a DC ground voltage may be applied to the display panel (DISP) during the display period.

Accordingly, a common voltage (VCOM) in the form of a DC voltage may be applied to the common electrodes (COM) disposed in the entire area of the display panel (DISP).

The touch display device 10 may display an image on the display panel (DISP), and may sense a touch by a pen 20 on the display panel (DISP) using the common voltage (VCOM) applied to the common electrodes (COM).

That is, during the display period, since the first ground voltage (GND1) corresponding to a DC ground voltage is applied to the display panel (DISP), the common voltage (VCOM) applied to the common electrodes (COM) disposed in the display panel (DISP) may not swing, but may remain in the DC voltage form. Accordingly, the touch display device 10 may detect a downlink signal output from the pen 20 to thus sense a pen touch while performing the display driving using the common electrodes (COM) during the display period.

Referring to FIG. 17, in Case B, the second ground voltage (GND2), which is a modulated ground voltage, and the first ground voltage (GND1), which is a DC ground voltage, may be applied at different timings to the display panel (DISP) during the display period.

During a period in which the second ground voltage (GND2) is applied in the display period, a common signal (SCOM), which is a modulated signal, is applied to the common electrodes (COM), and image display and finger-touch sensing (touch sensing) are performed.

During a period in which the first ground voltage (GND1) is applied in the display period, a common voltage (VCOM), which is a DC voltage, is applied to the common electrodes (COM), and image display and pen-touch sensing (pen sensing) are performed.

The touch display device 10 may control the two ground voltages (GND1) and (GND2) to be applied to the display panel (DISP) during the display period, thereby controlling the voltage states of the common electrodes (COM) and providing an image display function according thereto. Furthermore, it is possible to selectively provide one of a touch by a finger and a touch by a pen.

The second ground voltage (GND2) of the two ground voltages (GND1 and GND2) may be a modulated signal the voltage level of which varies, compared to the first ground voltage (GND1). On the contrary, compared to the second ground voltage (GND2), the first ground voltage (GND1) may be a modulated signal.

The touch display device 10 may simultaneously provide an image display function and a touch sensing (finger-touch sensing or pen-touch sensing) function by properly utilizing both of the two ground voltages (GND1 and GND2).

The uplink signal transmitted from the display panel (DISP) to the pen 20 during the display blank period may be, for example, a beacon signal for transmitting display panel (DISP) information or a ping signal for signal synchronization.

By using the above-described driving method, an uplink signal, such as a beacon signal or a ping signal, which plays an important role in touch driving for pen-touch sensing, can be stably transmitted from the display panel (DISP) to the pen 20.

Figure 18:
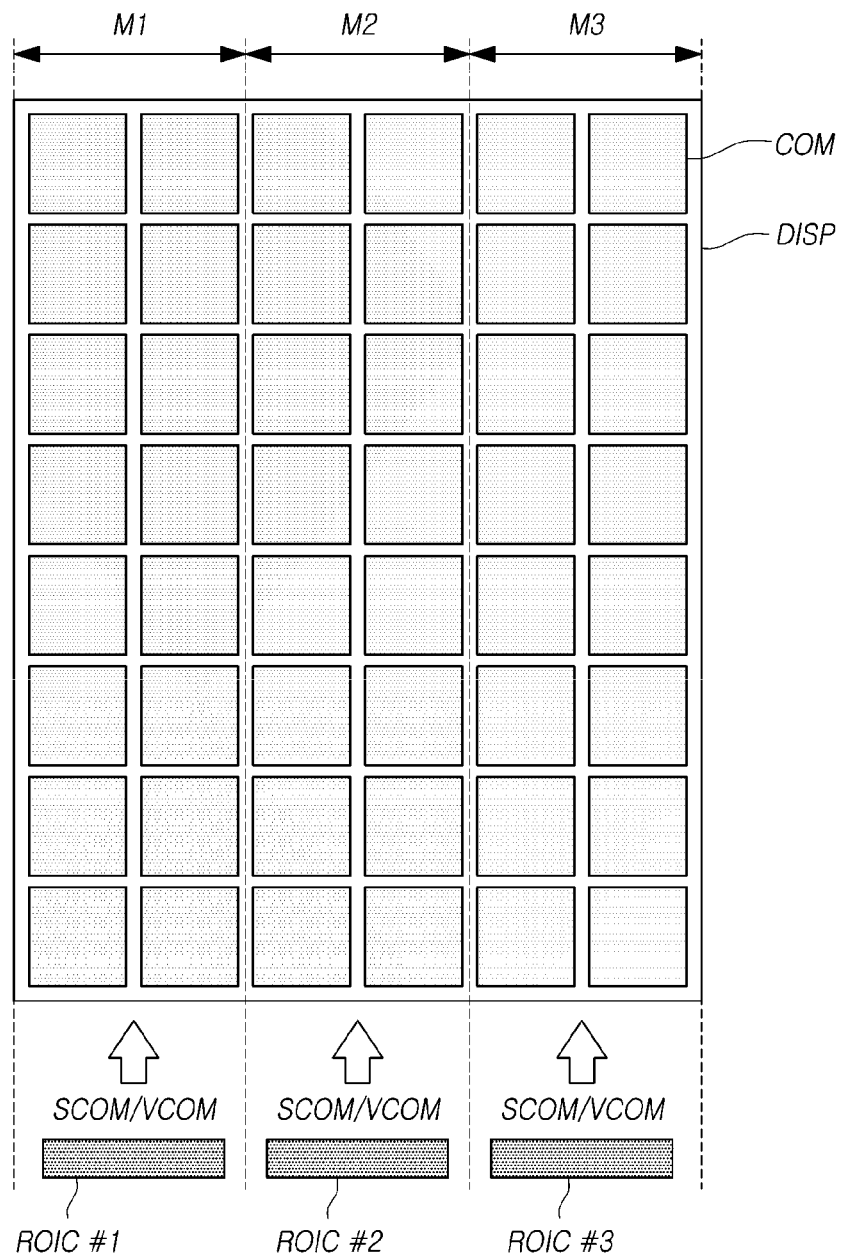
FIG. 18 is a view illustrating full driving performed in a display period in order to prevent distortion of an uplink signal caused by a palm in a touch system according to embodiments of the present disclosure.

FIG. 18 is a view illustrating full driving performed in a display period in order to prevent distortion of an uplink signal caused by a palm in a touch system according to embodiments of the present disclosure.

Referring to FIG. 18, the common-electrode driving circuit (CDC) may perform full driving for driving the entire area of the display panel (DISP) during an active time corresponding to the display period.

In the example shown FIG. 18, it is assumed that the common-electrode driving circuit (CDC) includes three driving ICs (ROIC #1, ROIC #2, and ROIC #3), and it is assumed that common electrodes (COM) disposed in the entire area of the display panel (DISP) are arranged in a matrix of 8 rows and 6 columns.

The region in which a first common-electrode column and a second common-electrode column are arranged corresponds to a region M1. The region in which a third common-electrode column and a fourth common-electrode column are arranged corresponds to a region M2. The region in which a fifth common-electrode column and a sixth common-electrode column are arranged corresponds to a region M3.

According to the example in FIG. 18, in the case of full driving, the first driving IC (ROIC #1) drives the first common-electrode column and the second common-electrode column arranged in the region M1, the second driving IC (ROIC #2) drives the third common-electrode column and the fourth common-electrode column arranged in the region M2, and the third driving IC (ROIC #3) drives the fifth common-electrode column and the sixth common-electrode column arranged in the region M3.

According to the example in FIG. 18, in the case of full driving, the first driving IC (ROIC #1) may supply a common voltage (VCOM) or a common signal (SCOM) to the first and second common-electrode columns arranged in the region M1, the second driving IC (ROIC #2) may supply a common voltage (VCOM) or a common signal (SCOM) to the third and fourth common-electrode columns arranged in the region M2, and the third driving IC (ROIC #3) may supply a common voltage (VCOM) or a common signal (SCOM) to the fifth and sixth common-electrode co columns arranged in the region M3.

After the full driving, like the above-described signal sensing method (touch sensing signal reception and sensing data generation) described above with reference to FIG. 12, the first driving IC (ROIC #1) sequentially senses the common electrodes (COM) in the first and second common-electrode columns, the second driving IC (ROIC #2) sequentially senses the common electrodes (COM) in the third and fourth common-electrode columns, and the third driving IC (ROIC #3) sequentially senses the common electrodes (COM) in the fifth and sixth common-electrode columns. Here, sensing the common electrode (COM) may mean detecting a signal from the common electrode (COM).

Thereby, the common-electrode driving circuit (CDC) may perform the full sensing for sensing the common electrodes (COM) disposed in the entire area of the display panel (DISP).

During one or more display periods, the touch controller (T-CTR) may sense a touch by a finger or a touch by a pen 20 based on sensing data (touch sensing data or pen sensing data) generated through the full sensing of the common-electrode driving circuit (CDC).

Figure 19:
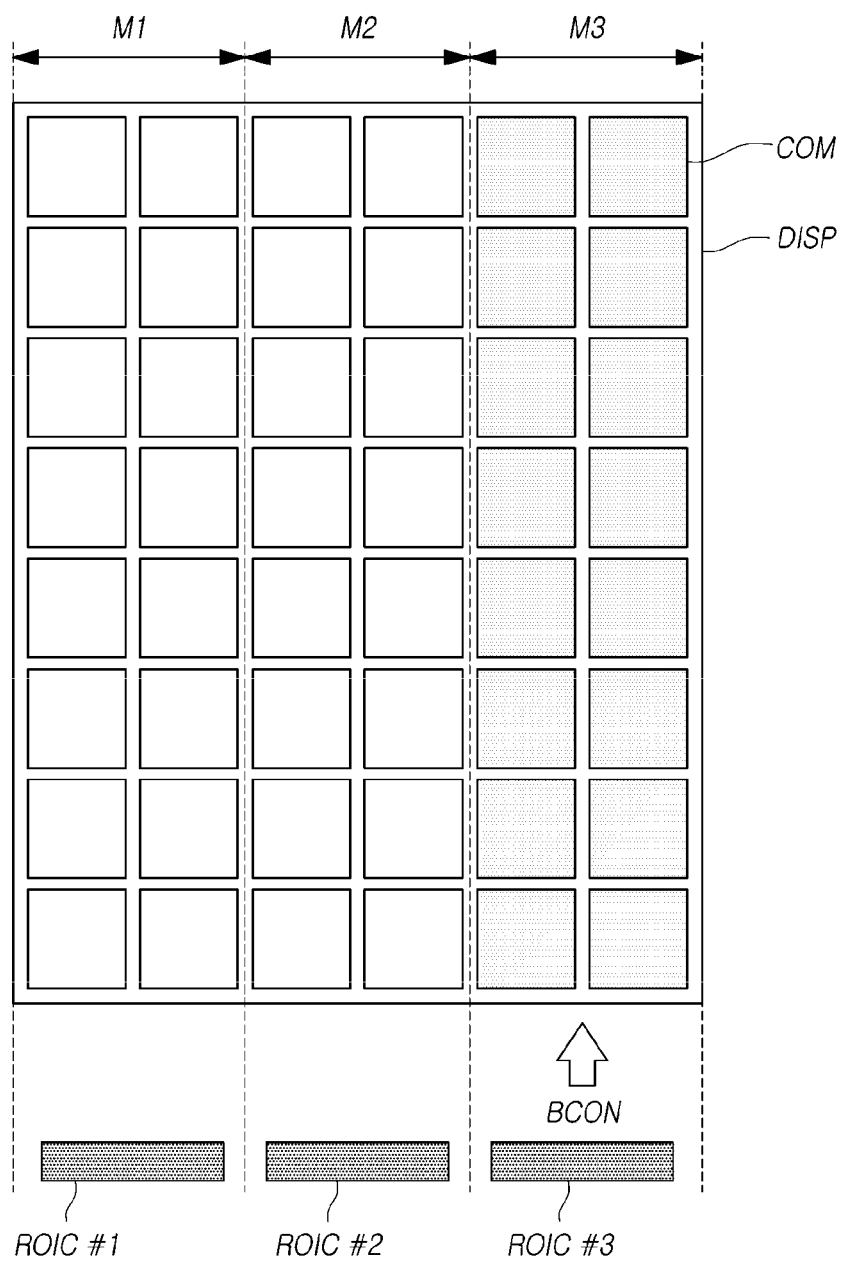
FIG. 19 is a view illustrating partial driving performed in a display blank period in order to prevent distortion of an uplink signal caused by a palm in a touch system according to embodiments of the present disclosure.

FIG. 19 is a view illustrating partial driving performed in a display blank period in order to prevent distortion of an uplink signal caused by a palm in a touch system according to embodiments of the present disclosure.

Referring to FIG. 19, the common-electrode driving circuit (CDC) may perform partial driving for driving a second region in the display panel (DISP) excluding at least one first region in the entire area thereof during a blank time corresponding to the display blank period.

The second region in the display panel (DISP) may correspond to a region in which the pen 20 is positioned. That is, when the pen 20 is positioned adjacent to the display panel (DISP) or when the display panel (DISP) and the pen 20 come into contact with each other, the touch display device 10 may obtain position information of the corresponding pen 20, and may output an uplink signal, such as a beacon signal or a ping signal, only to the second region of the display panel (DISP), in which the pen 20 is positioned.

According to the example in FIG. 19, the region M1 and the region M2 correspond to the first region in which the partial driving is not performed during the display blank period, and the region M3 corresponds to the second region in which the partial driving is performed during the display blank period.

According to the example in FIG. 19, when the partial driving is performed during the display blank period, the first driving IC (ROIC #1) does not drive the first common-electrode column and the second common-electrode column arranged in the region M1, which belongs to the first region, and the second driving IC (ROIC #2) does not drive the third common-electrode column and the fourth common-electrode column arranged in the region M2, which belongs to the first region, but the third driving IC (ROIC #3) may drive the fifth common-electrode column and the sixth common-electrode column arranged in the region M3, which belongs to the second region.

That is, when performing the partial driving during the display blank period, only the third driving IC (ROIC #3) may supply an uplink signal, such as a beacon signal (BCON), to the common electrodes (COM) disposed in the fifth common-electrode column and the sixth common-electrode column arranged in the region M3, which belongs to the second region.

As described above, the common-electrode driving circuit (CDC) may include at least one driving IC (ROIC #1 or ROIC #2) corresponding to the first region and at least one driving IC (ROIC #3) corresponding to the second region.

As described above, the full driving and the partial driving may be effectively performed using a plurality of driving ICs (ROIC #1, ROIC #2, and ROIC #3) included in the common-electrode driving circuit (CDC). In particular, the partial driving may be selectively performed using one or more of the plurality of driving ICs (ROIC #1, ROIC #2, and ROIC #3).

As described above, the uplink signal may be supplied to at least a portion of the entire area of the display panel (DISP) in the blank period.

In addition, the area where the uplink signal is supplied in the display panel (DISP) may be periodically changed with time in the blank period.

For example, the uplink signal may be supplied to the region M1 of the display panel (DISP) during the first blank period, the uplink signal may be supplied to the region M2 of the display panel (DISP) during the second blank period, and the uplink signal may be supplied to the region M3 of the display panel (DISP) during the third blank period. In addition, the uplink signal may be supplied to the region M1 of the display panel (DISP) again during the fourth blank period, the uplink signal may be supplied to the region M2 of the display panel (DISP) again during the fifth blank period, and the uplink signal may be supplied to the region M3 of the display panel (DISP) again during the sixth blank period.

By performing the above operation, it is possible to maintain a cycle in which the uplink signal is supplied to the respective regions M1, M2, and M3 of the display panel (DISP) to be constant, and the pen 20 positioned in the corresponding region may periodically receive the uplink signal.

In addition, in the blank period, the region to which the uplink signal is supplied in the display panel (DISP) may be changed aperiodically when an event occurs.

For example, when a user's posture for using the pen 20 is changed or when the number of pens 20 is increased or decreased, this may be detected as a change event in the partial supply region of the uplink signal, and the region to which the uplink signal is supplied may be changed in the display panel (DISP).

Figure 20:
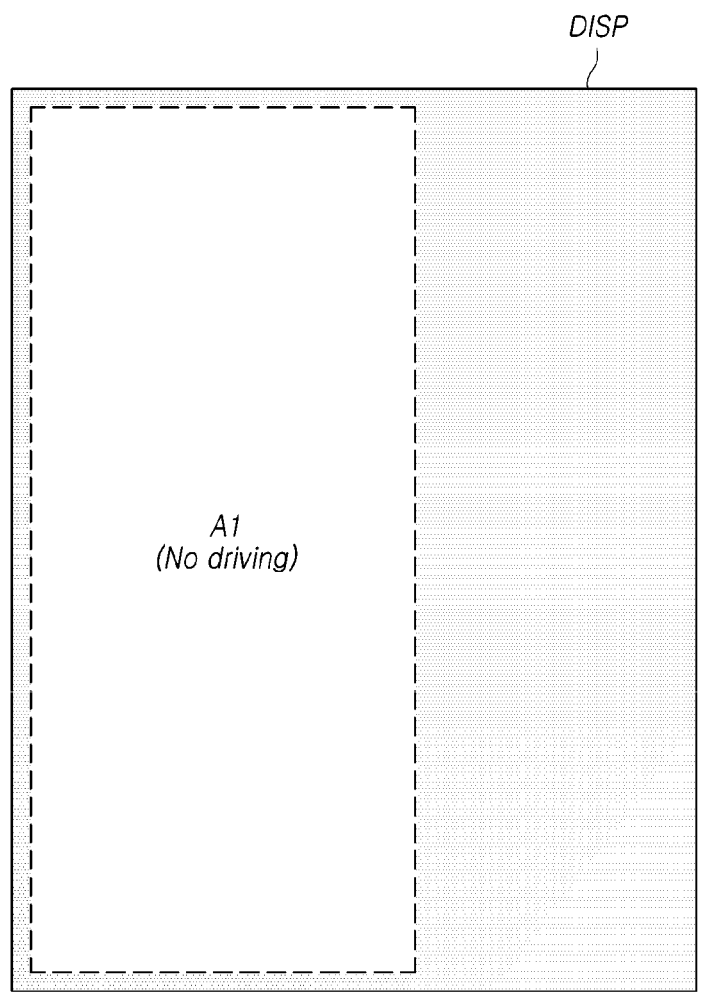
FIGS. 20 and 21 are exemplary views of regions where partial driving is performed in a display blank period in order to prevent distortion of an uplink signal caused by a palm in a touch system according to embodiments of the present disclosure.
Figure 21:
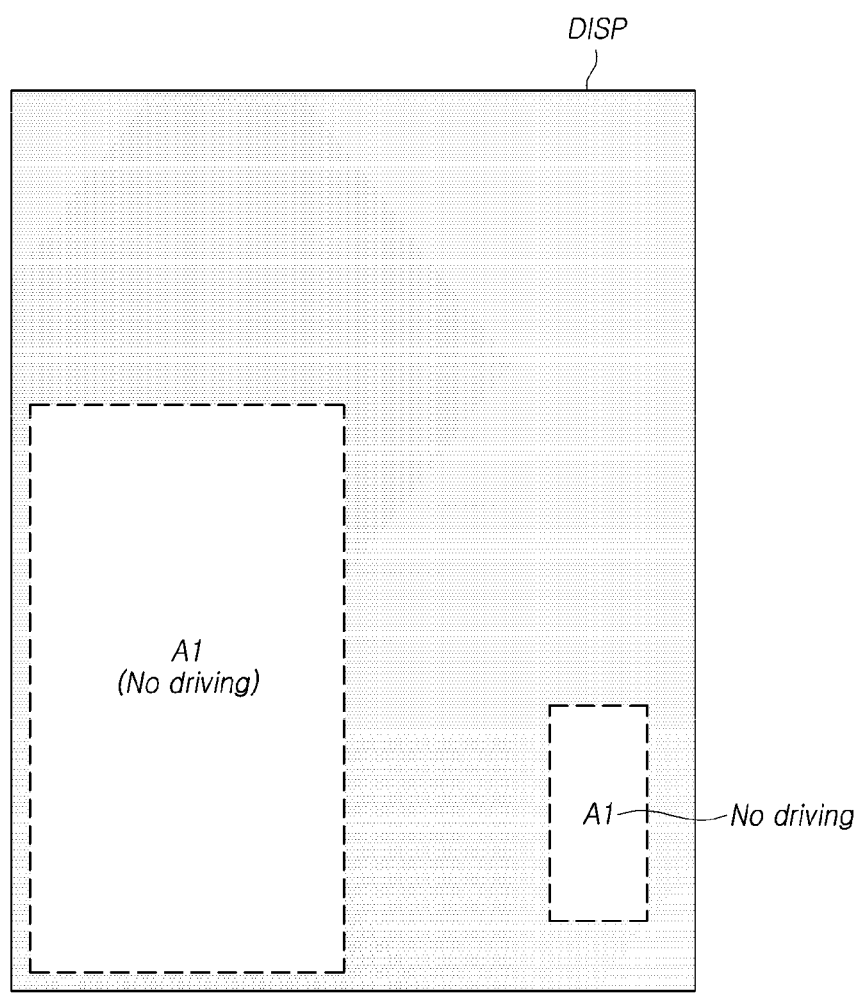

FIGS. 20 and 21 are exemplary views of regions where partial driving is performed in a display blank period in order to prevent distortion of an uplink signal caused by a palm in a touch system according to embodiments of the present disclosure.

As described above, during the blank time corresponding to the display blank period, at least one first region (A1) in which the common electrodes (COM), to which the uplink signal is not supplied, are disposed corresponds to a region in which the uplink signal may be distorted.

For example, at least one first region (A1) may be a region that is in contact with or is adjacent to a body part (e.g., a palm of a hand holding the pen 20, a palm of a hand opposite the hand holding the pen 20, or the like) of the user who uses the pen 20.

The at least one first region (A1) may be a region in which touch or proximity of a human body has been detected by means of touch coordinates, which are sensed through finger-touch sensing.

At least one of the number, size, or position of the first region(s) (A1) may vary depending on the environment in which the user uses the pen 20.

The second region of the display panel (DISP) may be a region left by excluding at least one first region (A1) from the entire area of the display panel (DISP), and may be a region where the uplink signal is not distorted.

The second region of the display panel (DISP) may be a region that is in contact with or is adjacent to the pen 20.

The second region of the display panel (DISP) may be a region (e.g., the region M3 in FIG. 19) in which common-electrode columns (e.g., the fifth and sixth common-electrode columns in FIG. 19) are disposed, which are driven by a driving IC (e.g., ROIC #3 in FIG. 19) for driving a common electrode (COM) that is in contact with or is adjacent to the pen 20.

Referring to FIG. 20, in the environment in which the user holds and uses the pen 20 by the right hand while placing the left hand on a left portion of the screen, the first region (A1) on which the left hand is placed (including the point P1 in FIG. 14) may be excluded from the partial driving during the display blank period.

Referring to FIG. 21, in the environment in which the user holds and uses the pen 20 by the right hand while placing the left hand on a left portion of the screen, the first region (A1) on which the left hand (including the point P1 in FIG. 14) is placed and a region (including the point P2 in FIG. 14) corresponding to a palm of the right hand holding the pen 20 may be excluded from the partial driving during the display blank period.

Figure 22:
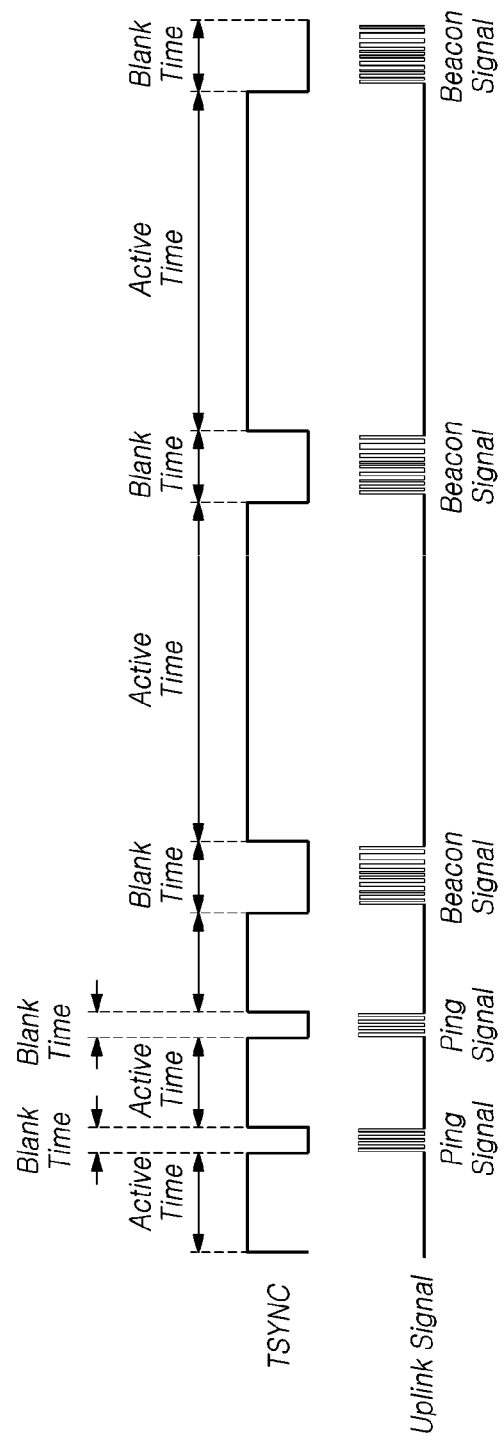
FIG. 22 is a view showing a transmission timing of a ping signal, which is another kind of uplink signal, in order to prevent distortion of an uplink signal caused by a palm in a touch system according to embodiments of the present disclosure.

FIG. 22 is a view showing a transmission timing of a ping signal, which is another kind of uplink signal, in order to prevent distortion of an uplink signal caused by a palm in a touch system according to embodiments of the present disclosure.

Referring to FIG. 22, a ping signal for synchronization, as well as a beacon signal, may be supplied only to the second region of the display panel (DISP) during the display blank period.

Respective display periods may have the same time length, or may have different time lengths as shown in FIG. 22.

Accordingly, one active time may correspond to one display frame time, or may not correspond to one display frame time.

According to the example of FIG. 22, each of three active times from the front is shorter than one display frame time, and each of the two remaining active times corresponds to one display frame time.

Figure 23:
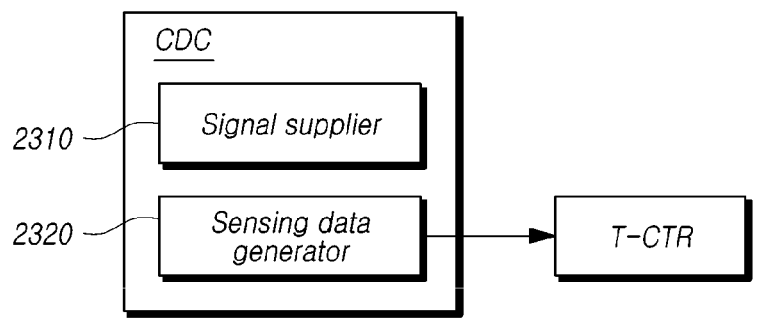
FIG. 23 is a schematic block diagram of a driving circuit according to embodiments of the present disclosure.

FIG. 23 is a schematic block diagram of a common-electrode driving circuit (CDC) included in a driving circuit according to embodiments of the present disclosure.

Referring to FIG. 23, a common-electrode driving circuit (CDC), according to embodiments of the present disclosure, may include a signal supplier 2310 for supplying various signals to a display panel (DISP) and a sensing data generator 2320 for generating and outputting sensing data.

The signal supplier 2310 may supply a common voltage (VCOM) or a common signal (SCOM) to the display panel (DISP), or may supply an uplink signal thereto.

The uplink signal may be transmitted to the pen 20 that is in contact with or is adjacent to the display panel (DISP).

The signal supplier 2310 may supply the uplink signal to a portion of the display panel (DISP), instead of the entire area thereof.

Therefore, the uplink signal including important information for pen-touch sensing can be stably and normally transmitted to the pen 20 during the display blank period, which is not affected by the display driving. Accordingly, the pen 20 can accurately recognize the uplink signal, thereby performing a normal driving operation for pen-touch sensing.

The signal supplier 2310 may supply a common voltage (VCOM) or a common signal (SCOM) to the entire area of the display panel (DISP) during the display period before or after the display blank period.

Therefore, a finger touch and/or pen touch may be sensed at the same time while displaying an image.

More specifically, an image may be displayed on the display panel (DISP) during the display period before or after the display blank period.

The signal supplier 2310 may output a common signal (SCOM) to the display panel (DISP) during the display period. The common signal (SCOM) may be a modulated signal.

During the display period, the sensing data generator 2320 may output touch sensing data corresponding to the signal detected from the common electrode (COM), to which the common signal (SCOM) has been supplied, in order to sense a touch.

Alternatively, the signal supplier 2310 may output a common voltage (VCOM) to the display panel (DISP) during the display period. The common voltage (VCOM) may be a DC voltage.

During the display period, the sensing data generator 2320 may detect, from the common electrode (COM), a downlink signal output from the pen 20 to the display panel (DISP), and may output pen sensing data, which corresponds to the detected downlink signal (corresponding to a sensing signal), for sensing the pen 20.

The signal supplier 2310 may include a pre-amplifier (Pre-AMP) in FIG. 11, and the sensing data generator 2320 may include a sample-and-hold circuit (SHA), an analog-to-digital converter (ADC), and the like in FIG. 11.

Figure 24:
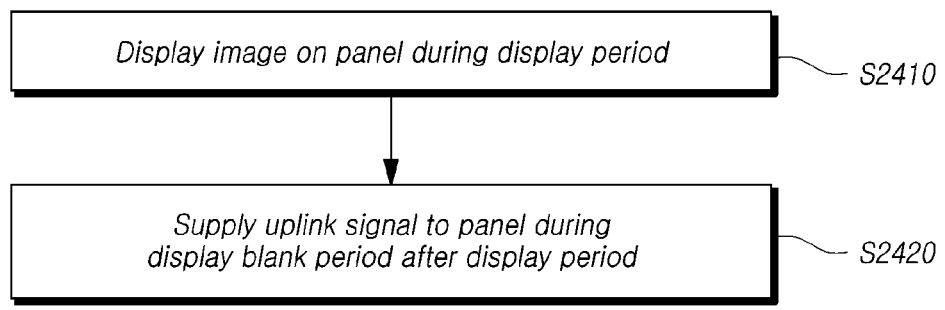
FIG. 24 is a flowchart of a driving method according to embodiments of the present disclosure.

FIG. 24 is a flowchart of a driving method according to embodiments of the present disclosure.

Referring to FIG. 24, a driving method, according to embodiments of the present disclosure, may include: displaying an image on a display panel during a display period (S2410); and supplying an uplink signal to the display panel (DISP) during a display blank period after the display period (S2420).

The uplink signal may be supplied to the second region of the display panel (DISP), excluding at least one first region, and may then be transmitted to the pen 20.

The pen 20 may be positioned in the second region.

By using the above-described driving method, the uplink signal including important information for pen-touch sensing can be stably and normally transmitted to the pen 20 during the display blank period, which is not affected by display driving. Accordingly, the pen 20 can accurately recognize the uplink signal, thereby performing a normal driving operation for pen-touch sensing.

Figure 25:
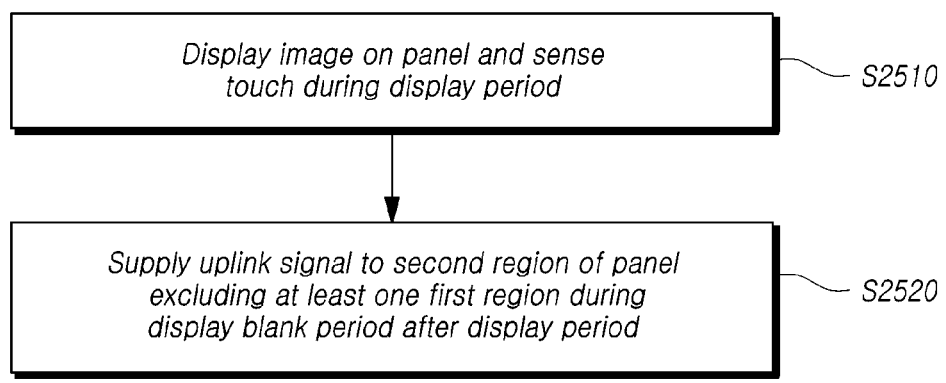
FIG. 25 is another flowchart of a driving method according to embodiments of the present disclosure.

FIG. 25 is another flowchart of a driving method according to embodiments of the present disclosure.

Referring to FIG. 25, a driving method, according to embodiments of the present disclosure, may include: displaying an image on a display panel during a display period and sensing a human body in at least one first region of the display panel (DISP) (S2510); and supplying an uplink signal to a second region of the display panel (DISP), excluding at least one first region, during a display blank period after the display period (S2520).

According to the above description, the touch display device 10 may detect a first region in which distortion of the uplink signal may be caused, and may set the second region as a region for the partial driving by excluding the detected first region from the entire area.

The embodiments of the present disclosure described above can provide a touch display device 10, a touch system, a driving circuit (CDC or a circuit including the same), and a driving method, which prevent distortion of a signal transmitted from a display panel (DISP) to a pen 20 (that is, an "uplink signal").

The embodiments of the present disclosure can provide a touch display device 10, a touch system, a driving circuit, and a driving method, which prevent noise from being caused by a human body, such as a palm, thereby accurately sensing a pen touch.

The embodiments of the present disclosure can provide a touch display device 10, a touch system, a driving circuit, and a driving method, which can accurately sense a pen touch while an image is displayed.

The embodiments of the present disclosure can provide a touch display device 10, a touch system, a driving circuit, and a driving method, which allow an uplink signal including important information for touch driving for pen-touch sensing to be stably transmitted from a display panel (DISP) to a pen 20.

The embodiments of the present disclosure can provide a touch display device 10, a touch system, a driving circuit, and a driving method, which prevent touch driving for pen-touch sensing from being affected by display driving and touch driving for finger-touch sensing.

The above description and the accompanying drawings provide an example of the technical idea of the present disclosure for illustrative purposes only. Those having ordinary knowledge in the technical field, to which the present disclosure pertains, will appreciate that various modifications and changes in form, such as combination, separation, substitution, and change of a configuration, are possible without departing from the essential features of the present disclosure. Therefore, the embodiments disclosed in the present disclosure are intended to illustrate the scope of the technical idea of the present disclosure, and the scope of the present disclosure is not limited by the embodiment. The scope of the present disclosure shall be construed on the basis of the accompanying claims in such a manner that all of the technical ideas included within the scope equivalent to the claims belong to the present disclosure.

What is claimed is:

1. A touch display device comprising:
 a display panel including a plurality of data lines, a plurality of gate lines, and a plurality of common electrodes, the display panel to drive display of an image based on data signals on the data lines and gate signals on the gate lines during a display period and to not drive the display of the image during a display blank period after the display period; and
 a driving circuit configured to supply an uplink signal to at least a subset of the plurality of common electrodes disposed in at least a first region of the display panel during the display blank period to enable the pen to detect the uplink signal when the pen is in contact with or is adjacent to the display panel.

2. The touch display device of claim 1, further comprising:
 a touch controller to sense a second region in the display panel that is in contact with or is adjacent to a human body; and
 wherein the driving circuit does not supply the uplink signal to common electrodes disposed in the second region of the display panel that is in contact with or is adjacent to the human body.

3. The touch display device of claim 1, wherein the driving circuit provides a touch driving signal to the plurality of common electrodes during a touch sensing period in the display period and wherein the uplink signal comprises a modulated signal having a higher voltage than the touch driving signal.

4. The touch display device of claim 1, wherein the driving circuit is configured to supply to the plurality of common electrodes during the display period one of: a common voltage comprising a DC voltage to sense the pen signal from the pen, a common signal comprising a modulated signal to sense a finger touch, and both the common voltage and the common signal during different sub-intervals of the display period.

5. The touch display device of claim 1, wherein a data driving circuit driving the data signals on the data lines is configured to boost the data signals based on the modulated signal when the modulated signal is provided to the plurality of common electrodes, and wherein a gate driving circuit driving the gate signals on the gate lines is configured to boost the gate signals based on the modulated signal when the modulated signal is provided to the plurality of common electrodes.

6. The touch display device of claim 1, wherein the display panel is configured to receive a first ground voltage during the display blank period, and
 wherein the display panel is configured to receive during the display period, one of: the first ground voltage, a second ground voltage different from the first ground voltage, and both the first ground voltage and the second ground voltage during different sub-intervals of the display period.

7. The touch display device of claim 6, wherein the display panel is configured to display an image and sense a touch by a finger when the second ground voltage is applied to the display panel during the display period.

8. The touch display device of claim 6, wherein the display panel is configured to display an image and sense a touch by the pen when the first ground voltage is applied to the display panel during the display period.

9. The touch display device of claim 6, wherein, compared to the first ground voltage, the second ground voltage is a modulated signal in which a voltage level varies over time.

10. The touch display device of claim 1, wherein the uplink signal comprises at least one of a beacon signal for transmitting display panel information and a ping signal for signal synchronization.

11. The touch display device of claim 1, wherein the driving circuit is configured to not supply the uplink signal to common electrodes disposed in at least a second region of the display panel during the display blank period, and wherein the driving circuit comprises:
 at least one driving IC configured to drive the common electrodes in the first region of the display panel; and
 at least one driving IC configured to drive the common electrodes in the second region of the display panel.

12. A driving circuit for driving a display panel having a plurality of data lines, a plurality of gate lines, and a plurality of common electrodes, the display panel to drive display of an image based on data signals on the data lines and gate signals on the gate lines during a display period and to not drive the display of the image during a display blank period following the display period, the driving circuit comprising:
 a signal supplier configured to supply at least one of a common DC voltage and a common modulated signal to the display panel during the display period, and to supply an uplink signal to at least a subset of the plurality of common electrodes disposed in at least a first region of the display panel during the display blank period,
 wherein the uplink signal is transmitted to a pen that is in contact with or is adjacent to the display panel.

13. The driving circuit of claim 12, wherein the signal supplier is configured to supply the common DC voltage or the common modulated signal to the plurality of electrodes disposed in an entire area of the display panel during the display period.

14. The driving circuit of claim 12, wherein the first region of the display panel is detected as being in contact with or is adjacent to the human body, and wherein the driving circuit does not supply the uplink signal to common electrodes disposed in a second region of the display panel that is in contact with or is adjacent to the human body.

15. The touch display device of claim 12, wherein the uplink signal comprises a modulated signal having a higher voltage than the common modulated signal.

16. A touch display device comprising:
- a display panel to drive display of an image during a display period, the display panel including a plurality of common electrodes;
- a touch controller to sense a first region of the display panel that is not in contact with a human body during a sensing period and a second region of the display panel that is in contact with the human body during the first sensing period, the first region including a first subset of the plurality of electrodes and the second region including a second subset of the plurality of electrodes; and
- a driving circuit configured to supply an uplink signal to the first subset of the plurality of electrodes in the first region of the display panel during an uplink period following the sensing period, and to not supply the uplink signal to the second subset of the plurality of electrodes in the second region of the display panel.

17. The touch display device of claim 16, wherein the sensing period occurs concurrently with the display period, and wherein the uplink period comprises a display blank period following the display period.

18. The touch display device of claim 17, wherein the driving circuit provides a modulated common signal to the plurality of electrodes during the display period for detecting a finger touch, and wherein the uplink signal comprises a modulated signal having a higher voltage than the modulated common signal.

19. The touch display device of claim 17, wherein the driving circuit provides a DC common voltage to the plurality of electrodes during the display period for detecting a pen touch.

20. The touch display device of claim 17, wherein the driving circuit alternately provides a modulated common signal to the plurality of electrodes and a DC common voltage to the plurality of electrodes during different sub-intervals of the display period, and wherein the touch controller alternately detects a finger touch and a pen touch during the different sub-intervals, and wherein the uplink signal comprises a modulated signal having a higher voltage than the modulated common signal.

* * * * *